(12) United States Patent
Gorai et al.

(10) Patent No.: US 9,735,625 B2
(45) Date of Patent: Aug. 15, 2017

(54) ELECTRIC POWER TRANSMISSION DEVICE, ELECTRIC POWER RECEPTION DEVICE, VEHICLE, AND NON-CONTACT ELECTRIC POWER FEED SYSTEM

(75) Inventors: Naoki Gorai, Toyota (JP); Shinji Ichikawa, Toyota (JP); Keisuke Inoue, Obu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 506 days.

(21) Appl. No.: 14/389,493

(22) PCT Filed: May 11, 2012

(86) PCT No.: PCT/JP2012/062131
§ 371 (c)(1),
(2), (4) Date: Sep. 30, 2014

(87) PCT Pub. No.: WO2013/168281
PCT Pub. Date: Nov. 14, 2013

(65) Prior Publication Data
US 2015/0115704 A1    Apr. 30, 2015

(51) Int. Cl.
*H02J 17/00* (2006.01)
*B60L 7/14* (2006.01)
(Continued)

(52) U.S. Cl.
CPC ............... *H02J 17/00* (2013.01); *B60L 7/14* (2013.01); *B60L 11/005* (2013.01);
(Continued)

(58) Field of Classification Search
CPC ........ H02J 17/00; H02J 13/0075; H02J 7/025; H02J 5/005; B60L 11/005; B60L 11/1833;
(Continued)

(56) References Cited

U.S. PATENT DOCUMENTS 7,741,734 B2    6/2010    Joannopoulos et al.
8,947,046 B2 *  2/2015    Ichikawa ............... B60K 6/445
                                                     320/108
(Continued)

FOREIGN PATENT DOCUMENTS

AU    2006-269374 B2    1/2007
AU    2006-269374 C1    1/2007
(Continued)

*Primary Examiner* — Jared Fureman
*Assistant Examiner* — Michael Warmflash
(74) *Attorney, Agent, or Firm* — Sughrue Mion, PLLC

(57) ABSTRACT

In a non-contact electric power feed system, electric power is supplied in a non-contact manner from an electric power transmission device to a vehicle representing an electric power reception device. The electric power transmission device includes an electric power transmission unit, a communication unit for radio communication with the electric power reception device, and a control device for controlling the electric power transmission unit. The control device varies transmitted electric power from the electric power transmission unit while the electric power transmission unit transmits electric power, and determines whether or not pairing between the vehicle specified as an electric power transmission target and the electric power transmission unit is appropriate, based on information on variation in electric power from the vehicle specified as the electric power transmission target through radio communication.

17 Claims, 15 Drawing Sheets

(51) Int. Cl.
  *B60L 11/00* (2006.01)
  *B60L 11/18* (2006.01)
  *H02J 5/00* (2016.01)
  *H02J 7/02* (2016.01)
  *H02J 13/00* (2006.01)
  *B60M 7/00* (2006.01)

(52) U.S. Cl.
  CPC ......... *B60L 11/182* (2013.01); *B60L 11/1833* (2013.01); *B60L 11/1846* (2013.01); *B60L 11/1887* (2013.01); *H02J 5/005* (2013.01); *H02J 7/025* (2013.01); *H02J 13/0075* (2013.01); *B60L 2210/10* (2013.01); *B60L 2210/30* (2013.01); *B60L 2210/40* (2013.01); *B60L 2220/14* (2013.01); *B60L 2240/72* (2013.01); *B60M 7/003* (2013.01); *Y02T 10/7022* (2013.01); *Y02T 10/7072* (2013.01); *Y02T 10/7216* (2013.01); *Y02T 10/7241* (2013.01); *Y02T 10/7291* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y02T 90/34* (2013.01); *Y04S 30/14* (2013.01)

(58) Field of Classification Search
  CPC .... B60L 11/1846; B60L 11/1887; B60L 7/14; B60L 11/182; Y02T 10/7072; Y02T 90/127; Y02T 90/128; Y02T 90/14; Y02T 10/7022; Y02T 90/121; Y04S 30/01
  USPC .................................................. 307/9.1, 104
  See application file for complete search history.

(56) References Cited

U.S. PATENT DOCUMENTS

| | | | |
|---|---|---|---|
| 9,379,780 B2* | 6/2016 | Widmer | ............... H04B 5/0037 |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2012/0161696 A1* | 6/2012 | Cook | ................... B60L 11/182 320/108 |
| 2012/0200151 A1* | 8/2012 | Obayashi | .............. B60L 11/123 307/9.1 |
| 2013/0057207 A1 | 3/2013 | Ichikawa et al. | |
| 2015/0084587 A1* | 3/2015 | Kato | ................... H02J 7/0027 320/108 |

FOREIGN PATENT DOCUMENTS

| | | |
|---|---|---|
| AU | 2007-349874 A2 | 10/2008 |
| AU | 2010-200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2009-501510 T | 1/2009 |
| JP | 2011-250555 A | 12/2011 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |

\* cited by examiner

ELECTRIC POWER TRANSMISSION DEVICE, ELECTRIC POWER RECEPTION DEVICE, VEHICLE, AND NON-CONTACT ELECTRIC POWER FEED SYSTEM

CROSS REFERENCE TO RELATED APPLICATIONS

This application is a National Stage of International Application No. PCT/JP2012/062131 filed May 11, 2012, the contents of all of which are incorporated herein by reference in their entirety.

TECHNICAL FIELD

The present invention relates to an electric power transmission device, an electric power reception device, a vehicle, and a non-contact electric power feed system, and more particularly to control of communication between a vehicle and an electric power transmission device in a non-contact electric power feed system for supplying electric power from an external power supply to the vehicle in a non-contact manner.

BACKGROUND ART

Non-contact wireless electric power transmission without using a power supply cord or an electric power transmission cable has recently attracted attention, and application to an electric car or a hybrid vehicle in which a car-mounted power storage device can be charged by a power supply outside a vehicle (hereinafter also referred to as an "external power supply") has been proposed.

Japanese Patent Laying-Open No. 2011-250555 (PTD 1) discloses an electric power feed system for supplying electric power in a non-contact manner to a vehicle from an electric power feed facility outside the vehicle, in which information such as charging efficiency or an amount of charge is conveyed between the electric power feed facility and the vehicle through radio communication and appropriate charging is carried out based on such information.

CITATION LIST

Patent Document

PTD 1: Japanese Patent Laying-Open No. 2011-250555

SUMMARY OF INVENTION

Technical Problem

Since a non-contact electric power feed system is premised on absence of wired connection between an electric power transmission device and a vehicle, basically, information is also desirably conveyed between the electric power transmission device and the vehicle through radio communication, as in Japanese Patent Laying-Open No. 2011-250555 (PTD1).

In transmitting electric power to a plurality of vehicles in the non-contact electric power feed system having a plurality of electric power transmission devices, depending on communication coverage of the electric power transmission devices and/or the vehicles, communication with a plurality of pieces of other equipment (vehicles, electric power transmission equipment) may be possible. Therefore, in some cases, where communicating equipment is actually located cannot necessarily be specified in radio communication. Then, an electric power transmission device and a vehicle may not appropriately be paired, which results, for example, in electric power transmission to a vehicle which should essentially be charged based on information on another vehicle parked in an adjacent parking space.

The present invention was made in order to solve such problems, and an object thereof is to correctly pair an electric power transmission device and an electric power reception device in a non-contact electric power feed system capable of conveying information between the electric power transmission device and the electric power reception device through radio communication.

Solution to Problem

An electric power transmission device according to the present invention supplies electric power to an electric power reception device in a non-contact manner. The electric power transmission device includes an electric power transmission unit capable of supplying electric power to the electric power reception device in a non-contact manner, a communication unit for radio communication with the electric power reception device, and a control device for controlling the electric power transmission unit. The control device determines whether or not a specified electric power reception device is an electric power reception device to which electric power is to be transmitted from the electric power transmission unit based on information from the electric power reception device specified as an electric power transmission target through radio communication by the communication unit when electric power transmitted from the electric power transmission unit is varied while the electric power transmission unit transmits electric power.

Preferably, the control device determines that the specified electric power reception device is the electric power reception device to which electric power is to be transmitted from the electric power transmission unit when information corresponding to variation in transmitted electric power has been received from the specified electric power reception device.

Preferably, the control device determines that the specified electric power reception device is not the electric power reception device to which electric power is to be transmitted from the electric power transmission unit when information corresponding to variation in transmitted electric power has not been received from the specified electric power reception device.

Preferably, the control device determines that another electric power reception device is the electric power reception device to which electric power is to be transmitted from the electric power transmission unit when information originating from variation in transmitted electric power has been received from another electric power reception device not specified as the electric power transmission target in the communication unit when the transmitted electric power from the electric power transmission unit is varied.

Preferably, the electric power transmission device further includes another electric power transmission unit different from the electric power transmission unit. The control device causes information on electric power transmission by the electric power transmission unit to be stored. The control device interchanges stored information on electric power transmission by the electric power transmission unit with information on electric power transmission by another electric power transmission unit when it is determined that another electric power reception device is the electric power reception device to which electric power is to be transmitted from the electric power transmission unit and when another electric power transmission unit has transmitted electric power to the specified electric power reception device.

Preferably, the control device changes the transmitted electric power by varying at least one of a current and a voltage.

Preferably, the electric power reception device includes an electric power reception unit for receiving electric power from the electric power transmission device in a non-contact manner. A difference in natural frequency between the electric power transmission unit and the electric power reception unit is not greater than ±10% of the natural frequency of the electric power transmission unit or the natural frequency of the electric power reception unit.

Preferably, the electric power reception device includes an electric power reception unit for receiving electric power from the electric power transmission device in a non-contact manner. A coefficient of coupling between the electric power transmission unit and the electric power reception unit is not greater than 0.1.

Preferably, the electric power reception device includes an electric power reception unit for receiving electric power from the electric power transmission device in a non-contact manner. The electric power reception unit receives electric power from the electric power transmission unit through at least one of magnetic field formed between the electric power reception unit and the electric power transmission unit and oscillating at a specific frequency and electric field formed between the electric power reception unit and the electric power transmission unit and oscillating at a specific frequency.

An electric power transmission device according to the present invention supplies electric power to an electric power reception device in a non-contact manner. The electric power transmission device includes first and second electric power transmission units, first and second control units for controlling the first and second electric power transmission units, respectively, and a control device for overall control of the first and second control units. The control device includes a communication unit for communicating with an electric power reception device. The control device determines whether or not the specified electric power reception device is an electric power reception device to which electric power is to be transmitted from the first electric power transmission unit based on information from the electric power reception device specified as an electric power transmission target of the first electric power transmission unit through radio communication by the communication unit when electric power transmitted from the first electric power transmission unit is varied while the first electric power transmission unit transmits electric power.

An electric power reception device according to the present invention receives electric power from an electric power transmission device in a non-contact manner. The electric power reception device includes a communication unit for radio communication with the electric power transmission device and a control device. The control device provides a request for variation in transmitted electric power to an electric power transmission device specified as the electric power transmission device which transmits electric power to the electric power reception device through radio communication by the communication unit while electric power is received, and determines whether or not the specified electric power transmission device is the electric power transmission device which should transmit electric power to the electric power reception device based on variation in transmitted electric power from the specified electric power transmission device.

Preferably, the control device determines that the specified electric power transmission device is the electric power transmission device which should transmit electric power to the electric power reception device when variation in transmitted electric power meets the request.

Preferably, the electric power reception device further includes an electric power reception unit for receiving electric power in a non-contact manner from an electric power transmission unit of the electric power transmission device. A difference in natural frequency between the electric power transmission unit and the electric power reception unit is not greater than ±10% of the natural frequency of the electric power transmission unit or the natural frequency of the electric power reception unit.

Preferably, the electric power reception device further includes an electric power reception unit for receiving electric power in a non-contact manner from an electric power transmission unit of the electric power transmission device. A coefficient of coupling between the electric power transmission unit and the electric power reception unit is not greater than 0.1.

Preferably, the electric power reception device further includes an electric power reception unit for receiving electric power in a non-contact manner from an electric power transmission unit of the electric power transmission device. The electric power reception unit receives electric power from the electric power transmission unit through at least one of magnetic field formed between the electric power reception unit and the electric power transmission unit and oscillating at a specific frequency, and electric field formed between the electric power reception unit and the electric power transmission unit and oscillating at a specific frequency.

A vehicle according to the present invention includes the electric power reception device described above, a power storage device chargeable with electric power received by the electric power reception device, and a drive device for generating running driving force with electric power from the power storage device.

A non-contact electric power feed system according to the present invention conveys electric power between an electric power transmission device and a vehicle in a non-contact manner. The electric power transmission device and the vehicle are configured to be capable of radio communication with each other. The electric power transmission device includes an electric power transmission unit capable of supplying electric power to the vehicle in a non-contact manner and a control device for controlling the electric power transmission unit. The control device determines whether or not the specified vehicle is a vehicle to which electric power is to be transmitted from the electric power transmission unit based on information from the vehicle specified as an electric power transmission target through radio communication when transmitted electric power from the electric power transmission unit is varied while the electric power transmission unit is transmitting electric power.

Advantageous Effects of Invention

According to the present invention, in a non-contact electric power feed system capable of conveying information between an electric power transmission device and an electric power reception device through radio communication, the electric power transmission device and the electric power reception device can correctly be paired.

DESCRIPTION OF EMBODIMENTS

Figure 1:
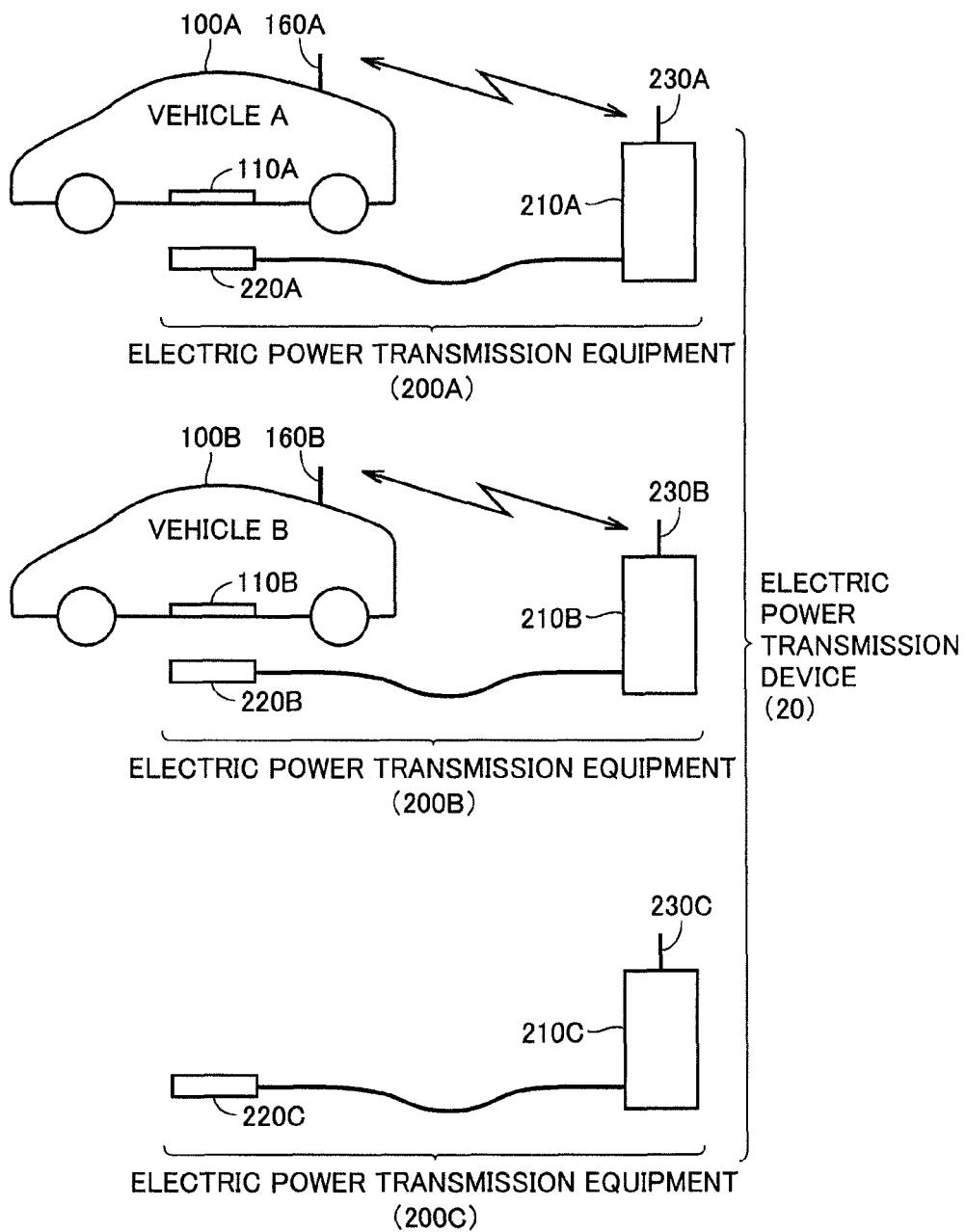
FIG. 1 is an overall configuration diagram of a vehicle electric power feed system according to a first embodiment of the present invention.

An embodiment of the present invention will be described hereinafter in detail with reference to the drawings. In the drawings, the same or corresponding elements have the same reference characters allotted and description thereof will not be repeated.

First Embodiment (Configuration of Non-Contact Electric Power Feed System)

FIG. 1 is an overall configuration diagram of a vehicle electric power feed system (a non-contact electric power feed system) 10 according to a first embodiment of the present invention. Referring to FIG. 1, vehicle electric power feed system 10 includes an electric power transmission device 20 including a plurality of pieces of electric power transmission equipment 200A, 200B, and 200C and vehicles 100A and 100B.

Though FIG. 1 shows electric power transmission device 20 including three pieces of electric power transmission equipment 200A, 200B, and 200C, the number of pieces of electric power transmission equipment can be set to any number so long as it is two or more. The number of vehicles is not limited to two as shown in FIG. 1 either, and a vehicle should only correspond to at least one of the plurality of pieces of electric power transmission equipment.

The plurality of pieces of electric power transmission equipment 200A, 200B, and 200C are basically the same in configuration, and vehicles 100A and 100B are also the same in configuration. Therefore, in the description below, the plurality of pieces of electric power transmission equipment 200A, 200B, and 200C are denoted representatively as "electric power transmission equipment 200" and vehicles 100A and 100B are denoted representatively as a "vehicle 100". Each element constituting electric power transmission equipment and a vehicle is also similarly denoted.

Vehicle 100 includes an electric power reception unit 110 and a communication unit 160. Electric power transmission equipment 200 includes a power supply device 210, an electric power transmission unit 220, and a communication unit 230.

Electric power reception unit 110 is installed, for example, on a bottom surface of a vehicle body and receives in a non-contact manner, high-frequency alternating-current (AC) power output from electric power transmission unit 220 of electric power transmission equipment 200 through electromagnetic field. A detailed configuration of electric power reception unit 110 will be described later together with a configuration of electric power transmission unit 220 and electric power transmission from electric power transmission unit 220 to electric power reception unit 110. Communication unit 160 is a communication interface for vehicle 100 to communicate with electric power transmission equipment 200.

Power supply device 210 in electric power transmission equipment 200 generates AC power having a prescribed frequency. By way of example, power supply device 210 receives electric power from a not-shown system power supply, generates high-frequency AC power, and supplies generated AC power to electric power transmission unit 220.

Electric power transmission unit 220 is installed, for example, on a floor surface of a parking lot, and receives supply of high-frequency AC power from power supply device 210. Then, electric power transmission unit 220 outputs in a non-contact manner, electric power to electric power reception unit 110 of vehicle 100 through electromagnetic field generated around electric power transmission unit 220. A detailed configuration of electric power transmission unit 220 will also be described later together with a configuration of electric power reception unit 110 and electric power transmission from electric power transmission unit 220 to electric power reception unit 110. Communication unit 230 is a communication interface for electric power transmission equipment 200 to communicate with vehicle 100.

Thus, in vehicle electric power feed system 10, electric power is transmitted in a non-contact manner from electric power transmission unit 220 of electric power transmission equipment 200 to electric power reception unit 110 of vehicle 100.

Figure 2:
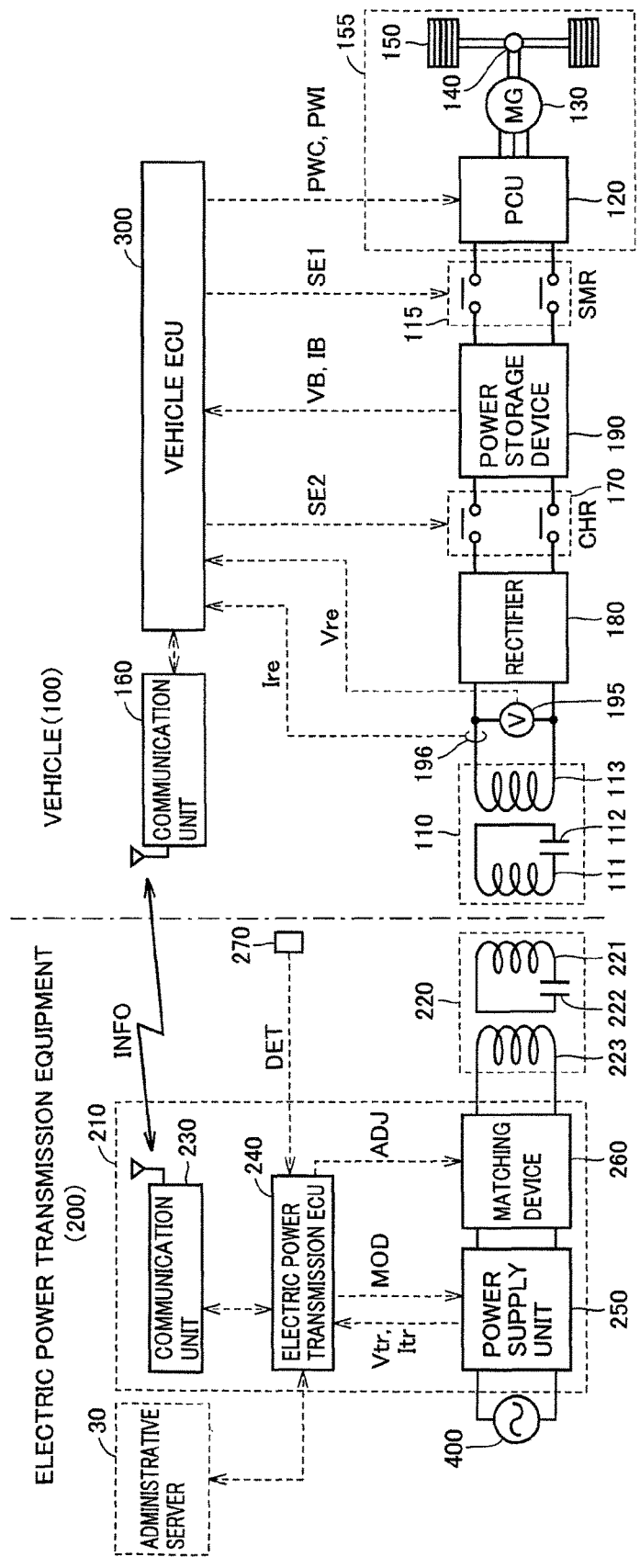
FIG. 2 is a functional block diagram illustrating in detail a configuration of a vehicle and an electric power transmission device shown in FIG. 1.

FIG. 2 is a detailed configuration diagram of vehicle electric power feed system 10 shown in FIG. 1. Referring to FIG. 2, electric power transmission equipment 200 includes power supply device 210, electric power transmission unit 220, and a vehicle detection unit 270 as described above. Power supply device 210 further includes an electric power transmission ECU 240 representing a control device, a power supply unit 250, and a matching device 260, in addition to communication unit 230. Electric power transmission unit 220 includes a resonance coil 221, a capacitor 222, and an electromagnetic induction coil 223.

Power supply unit 250 is controlled by a control signal MOD from electric power transmission ECU 240, and converts electric power received from such an AC power supply as a commercial power supply 400 into high-frequency electric power. Power supply unit 250 then supplies the converted high-frequency electric power through matching device 260 to electromagnetic induction coil 223.

Power supply unit 250 outputs to electric power transmission ECU 240, an electric power transmission voltage Vtr and an electric power transmission current Itr detected by a voltage sensor and a current sensor, respectively, which are not shown.

Matching device 260 is a circuit for impedance matching between electric power transmission equipment 200 and vehicle 100. Matching device 260 is provided between power supply unit 250 and electric power transmission unit 220 and can change impedance of a circuit. Though any feature can be adopted for matching device 260, by way of example, a matching device can be constituted of a variable capacitor and a coil (not shown) and impedance can be changed by varying a capacitance of the variable capacitor. By changing impedance in this matching device 260, impedance of electric power transmission equipment 200 can be matched with impedance of vehicle 100 (impedance matching). Though FIG. 2 shows matching device 260 as being separate from power supply unit 250, power supply unit 250 may incorporate a function of matching device 260.

Vehicle detection unit 270 detects presence of vehicle 100 within electric power transmission coverage of electric power transmission equipment 200. Vehicle detection unit 270 can include, for example, any sensor such as a non-contact laser, infrared, or ultrasonic sensor, a contact sensor such as a limit switch, or a load sensor for sensing a vehicle weight.

Resonance coil 221 transfers electric power in a non-contact manner to a resonance coil 111 included in electric power reception unit 110 of vehicle 100. Electric power transmission between electric power reception unit 110 and electric power transmission unit 220 will be described later with reference to FIG. 3.

As described above, communication unit 230 is a communication interface for radio communication between electric power transmission equipment 200 and vehicle 100, and supplies and receives information INFO to and from communication unit 160 on a vehicle 100 side. Communication unit 230 receives vehicle information transmitted from communication unit 160 and a signal indicating start and stop of electric power transmission, and outputs such received information to electric power transmission ECU 240. Communication unit 230 transmits to vehicle 100, information including electric power transmission voltage Vtr and electric power transmission current Itr from electric power transmission ECU 240.

Electric power transmission ECU 240 includes a CPU (Central Processing Unit), a storage device, and an input/output buffer, none of which is shown in FIG. 1, receives input of signals from each sensor and the like and outputs control signals to each piece of equipment, and controls each piece of equipment in power supply device 210. It is noted that such control is not limited to processing by software and processing with dedicated hardware (electronic circuitry) can also be performed.

Vehicle 100 includes, in addition to electric power reception unit 110 and communication unit 160, a charge relay CHR 170, a rectifier 180, a power storage device 190, a system main relay SMR 115, a drive device 155, a vehicle ECU (Electronic Control Unit) 300 representing a control device, a voltage sensor 195, and a current sensor 196.

Drive device 155 includes a power control unit PCU (Power Control Unit) 120, a motor generator 130, a motive power transmission gear 140, and a drive wheel 150. Electric power reception unit 110 includes resonance coil 111, a capacitor 112, and an electromagnetic induction coil 113.

Though an electric car is described as vehicle 100 by way of example in the present embodiment, a configuration of vehicle 100 is not limited thereto so long as a vehicle can run with electric power stored in a power storage device. Other examples of vehicle 100 include a hybrid vehicle incorporating an engine, a fuel cell car incorporating a fuel cell, and the like.

Resonance coil 111 receives electric power from resonance coil 221 included in electric power transmission equipment 200 in a non-contact manner.

Rectifier 180 rectifies AC power received from electromagnetic induction coil 113 and outputs rectified direct-current (DC) power to power storage device 190 through CHR 170. Rectifier 180 can be configured, for example, to include a diode bridge and a smoothing capacitor (neither of which is shown). What is called a switching regulator which carries out rectification based on switching control can also be employed as rectifier 180. In a case where rectifier 180 is included in electric power reception unit 110, in order to prevent malfunction or the like of a switching element involved with generated electromagnetic field, a static rectifier such as a diode bridge is more preferred.

CHR 170 is electrically connected between rectifier 180 and power storage device 190. CHR 170 is controlled by a control signal SE2 from vehicle ECU 300 and switches between supply and cut-off of electric power from rectifier 180 to power storage device 190.

Power storage device 190 is an electric power storage component configured to be chargeable and dischargeable. Power storage device 190 is implemented, for example, by such a secondary battery as a lithium ion battery, a nickel metal hydride battery, or a lead acid battery, or a power storage element such as an electric double layer capacitor.

Power storage device 190 is connected to rectifier 180. Power storage device 190 stores electric power received by electric power reception unit 110 and rectified by rectifier 180. In addition, power storage device 190 is connected also to PCU 120 with SMR 115 being interposed. Power storage device 190 supplies electric power for generating vehicle driving force to PCU 120. Moreover, power storage device 190 stores electric power generated by motor generator 130. Output from power storage device 190 is, for example, around 200 V.

Though not shown in FIG. 2, in a case where an electric power reception voltage and a charging voltage of power storage device 190 are different from each other, such an electric power conversion device as a DC-DC converter may be provided between rectifier 180 and power storage device 190. As in electric power transmission equipment 200, a matching device for impedance matching may be provided.

Power storage device 190 is provided with a voltage sensor and a current sensor for detecting a voltage VB and an input and output current IB of power storage device 190, although they are not shown. These detection values are output to vehicle ECU 300. Vehicle ECU 300 calculates a state of charge (also referred to as "SOC") of power storage device 190 based on these voltage VB and current IB.

SMR 115 is electrically connected between power storage device 190 and PCU 120. Then, SMR 115 is controlled by a control signal SE1 from vehicle ECU 300 and switches between supply and cut-off of electric power between power storage device 190 and PCU 120.

PCU 120 includes a converter and an inverter, although they are not shown. The converter converts a voltage from power storage device 190 under the control by a control signal PWC from vehicle ECU 300. The inverter drives motor generator 130 with the use of electric power converted by the converter, under the control by a control signal PWI from vehicle ECU 300.

Motor generator 130 is an AC rotating electric machine, and for example, it is a permanent magnet type synchronous motor including a rotor having a permanent magnet embedded.

Output torque of motor generator 130 is transmitted to drive wheel 150 through motive power transmission gear 140. Vehicle 100 runs with this torque. Motor generator 130 can generate electric power with rotational force of drive wheel 150 during a regenerative braking operation of vehicle 100. Then, PCU 120 causes generated electric power to be converted to charging power for power storage device 190.

In a hybrid car incorporating an engine (not shown) in addition to motor generator 130, the engine and motor generator 130 are operated in coordination, so that necessary vehicle driving force is generated. In this case, power storage device 190 can be charged also with electric power generated through rotation of the engine.

As described above, communication unit 160 is a communication interface for radio communication between vehicle 100 and electric power transmission equipment 200, and supplies and receives information INFO to and from communication unit 230 of electric power transmission equipment 200. Information INFO output from communication unit 160 to electric power transmission equipment 200 includes vehicle information from vehicle ECU 300 or a signal indicating start and stop of electric power transmission.

Vehicle ECU 300 includes a CPU, a storage device, and an input/output buffer, none of which is shown in FIG. 1, receives input of signals from each sensor and the like and outputs control signals to each piece of equipment, and controls each piece of equipment in vehicle 100. It is noted that such control is not limited to processing by software and processing with dedicated hardware (electronic circuitry) can also be performed.

Voltage sensor 195 is connected in parallel to electromagnetic induction coil 113, and detects an electric power reception voltage Vre received by electric power reception unit 110. Current sensor 196 is provided in a power line connecting electromagnetic induction coil 113 and rectifier 180 to each other and detects an electric power reception current Ire. Detected electric power reception voltage Vre and electric power reception current Ire are transmitted to vehicle ECU 300 and used for operation of transmission efficiency.

Though FIG. 2 shows electric power reception unit 110 and electric power transmission unit 220 provided with electromagnetic induction coils 113 and 223, respectively, electric power reception unit 110 and electric power transmission unit 220 not provided with electromagnetic induction coils 113 and 223, respectively, can also be acceptable. In this case, though not shown in FIG. 2, resonance coil 221 is connected to matching device 260 in electric power transmission unit 220, and resonance coil 111 is connected to rectifier 180 in electric power reception unit 110.

(Principles of Electric Power Transmission)

Figure 3:
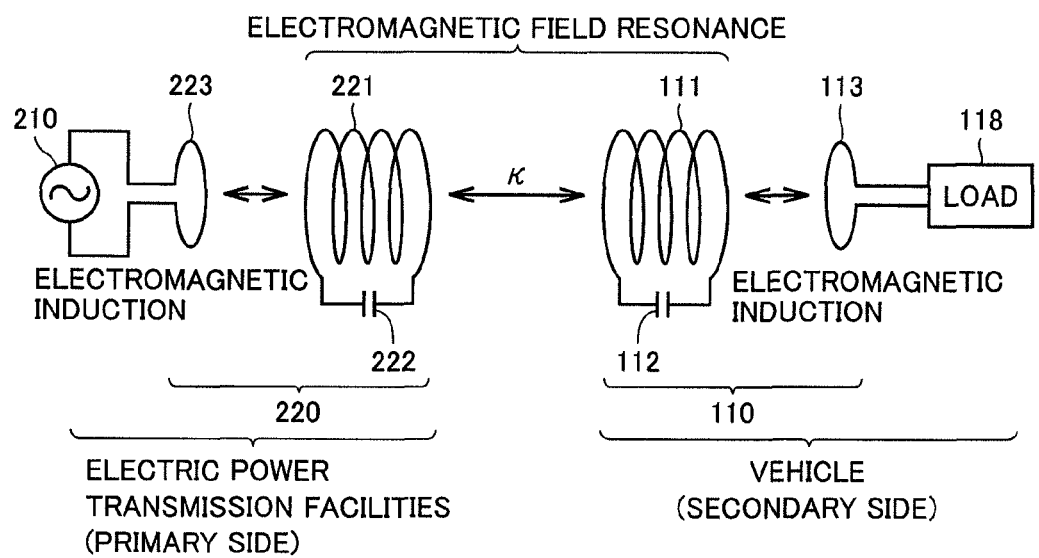
FIG. 3 is an equivalent circuit diagram during electric power transmission from the electric power transmission device to the vehicle.

FIG. 3 is an equivalent circuit diagram during electric power transmission from electric power transmission equipment 200 to vehicle 100. Referring to FIG. 3, electric power transmission unit 220 of electric power transmission equipment 200 includes resonance coil 221, capacitor 222, and electromagnetic induction coil 223.

Electromagnetic induction coil 223 is provided at a prescribed interval from resonance coil 221, for example, substantially coaxially with resonance coil 221. Electromagnetic induction coil 223 is magnetically coupled to resonance coil 221 through electromagnetic induction, and supplies high-frequency electric power supplied from power supply device 210 to resonance coil 221 through electromagnetic induction.

Resonance coil 221 forms an LC resonance circuit together with capacitor 222. As will be described later, an LC resonance circuit is formed also in electric power reception unit 110 of vehicle 100. A difference in natural frequency between the LC resonance circuit formed from resonance coil 221 and capacitor 222 and the LC resonance circuit of electric power reception unit 110 is not greater than ±10% of the natural frequency of the former or the natural frequency of the latter. Resonance coil 221 receives electric power from electromagnetic induction coil 223 through electromagnetic induction, and transmits electric power in a non-contact manner to electric power reception unit 110 of vehicle 100.

Electromagnetic induction coil 223 is provided for facilitating electric power feed from power supply device 210 to resonance coil 221, and power supply device 210 may directly be connected to resonance coil 221 without providing electromagnetic induction coil 223. Capacitor 222 is provided for adjustment of a natural frequency of the resonance circuit, and capacitor 222 does not have to be provided in a case where a desired natural frequency can be obtained by making use of a stray capacitance of resonance coil 221.

Electric power reception unit 110 of vehicle 100 includes resonance coil 111, capacitor 112, and electromagnetic induction coil 113. Resonance coil 111 forms an LC resonance circuit together with capacitor 112. As described above, a difference in natural frequency between the LC resonance circuit formed from resonance coil 111 and capacitor 112 and the LC resonance circuit formed from resonance coil 221 and capacitor 222 in electric power transmission unit 220 of electric power transmission equipment 200 is ±10% of the natural frequency of the former or the natural frequency of the latter. Resonance coil 111 receives electric power in a non-contact manner from electric power transmission unit 220 of electric power transmission equipment 200.

Electromagnetic induction coil 113 is provided at a prescribed interval from resonance coil 111, for example, substantially coaxially with resonance coil 111. Electromagnetic induction coil 113 is magnetically coupled to resonance coil 111 through electromagnetic induction, and extracts electric power received by resonance coil 111 through electromagnetic induction and outputs the electric power to an electric load device 118. Electric load device 118 comprehensively represents electric equipment including rectifier 180 (FIG. 2) and subsequent equipment.

Electromagnetic induction coil 113 is provided for facilitating extraction of electric power from resonance coil 111, and rectifier 180 may directly be connected to resonance coil 111 without providing electromagnetic induction coil 113. Capacitor 112 is provided for adjustment of a natural frequency of the resonance circuit, and capacitor 112 does not have to be provided in a case where a desired natural frequency can be obtained by making use of a stray capacitance of resonance coil 111.

In electric power transmission equipment 200, high-frequency AC power is supplied from power supply device 210 to electromagnetic induction coil 223, and electric power is supplied to resonance coil 221 by means of electromagnetic induction coil 223. Then, energy (electric power) moves from resonance coil 221 to resonance coil 111 through magnetic field formed between resonance coil 221 and resonance coil 111 of vehicle 100. Energy (electric power) which has moved to resonance coil 111 is extracted through electromagnetic induction coil 113 and transmitted to electric load device 118 of vehicle 100.

As described above, in this electric power transmission system, a difference in natural frequency between electric power transmission unit 220 of electric power transmission equipment 200 and electric power reception unit 110 of vehicle 100 is not greater than ±10% of the natural frequency of electric power transmission unit 220 or the natural frequency of electric power reception unit 110. By setting the natural frequencies of electric power transmission unit 220 and electric power reception unit 110 within such a range, electric power transmission efficiency can be enhanced. If a difference in natural frequency above is greater than ±10%, electric power transmission efficiency is lower than 10%, which can lead to such a disadvantage as a longer time period of electric power transmission.

The natural frequency of electric power transmission unit 220 (electric power reception unit 110) means an oscillation frequency in a case where an electric circuit (a resonance circuit) forming electric power transmission unit 220 (electric power reception unit 110) freely oscillates. It is noted that a natural frequency at the time when braking force or electric resistance is set to substantially zero in an electric circuit (a resonance circuit) forming electric power transmission unit 220 (electric power reception unit 110) is also called a resonance frequency of electric power transmission unit 220 (electric power reception unit 110).

Figure 4:
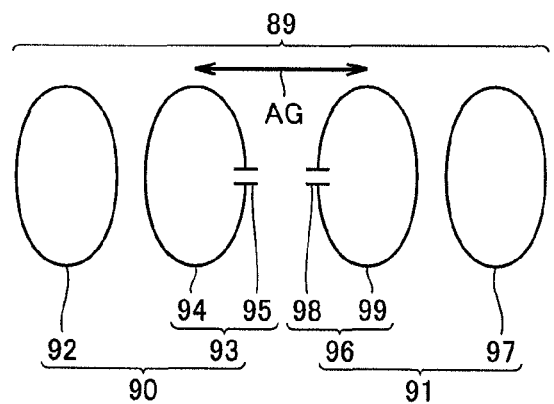
FIG. 4 is a diagram showing a simulation model of an electric power transmission system.
Figure 5:
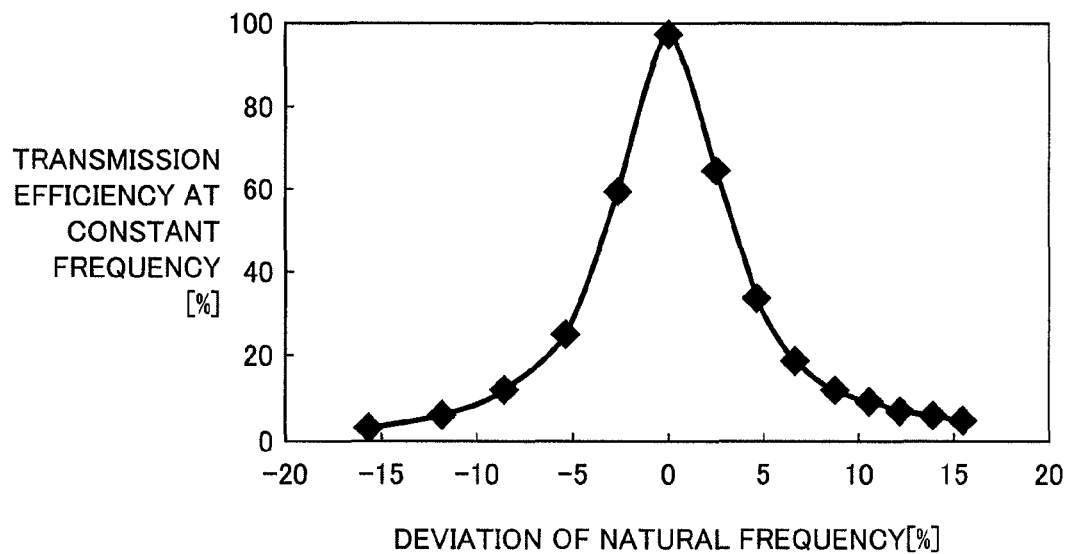
FIG. 5 is a diagram showing relation between electric power transmission efficiency and deviation in natural frequency between an electric power transmission unit and an electric power reception unit.

Simulation results of analysis of relation between a difference in natural frequency and electric power transmission efficiency will be described with reference to FIGS. 4 and 5. FIG. 4 is a diagram showing a simulation model of an electric power transmission system. FIG. 5 is a diagram showing relation between electric power transmission efficiency and deviation in natural frequency between an electric power transmission unit and an electric power reception unit.

Referring to FIG. 4, an electric power transmission system 89 includes an electric power transmission unit 90 and an electric power reception unit 91. Electric power transmission unit 90 includes a first coil 92 and a second coil 93. Second coil 93 includes a resonance coil 94 and a capacitor 95 provided in resonance coil 94. Electric power reception unit 91 includes a third coil 96 and a fourth coil 97. Third coil 96 includes a resonance coil 99 and a capacitor 98 connected to this resonance coil 99.

An inductance of resonance coil 94 is denoted as an inductance Lt and a capacitance of capacitor 95 is denoted as a capacitance C1. An inductance of resonance coil 99 is denoted as an inductance Lr and a capacitance of capacitor 98 is denoted as a capacitance C2. With setting of each parameter as such, a natural frequency f1 of second coil 93 is expressed in an equation (1) below and a natural frequency f2 of third coil 96 is expressed in an equation (2) below.

$$f1=1/\{2\pi(Lt \times C1)^{1/2}\} \quad (1)$$

$$f2=1/\{2\pi(Lr \times C2)^{1/2}\} \quad (2)$$

Here, relation between deviation in natural frequency between second coil 93 and third coil 96 and electric power transmission efficiency, in a case where inductance Lr and capacitances C1, C2 are fixed and only inductance Lt is varied, is shown in FIG. 5. It is noted that, in this simulation, relative positional relation between resonance coil 94 and resonance coil 99 is fixed and in addition, a frequency of a current supplied to second coil 93 is constant.

In the graph shown in FIG. 5, the abscissa represents deviation (%) in natural frequency and the ordinate represents electric power transmission efficiency (%) of a current at a constant frequency. Deviation (%) in natural frequency is expressed in an equation (3) below.

$$\text{(Deviation in Natural Frequency)}=\{(f1-f2)/f2\}\times 100 \text{ (\%)} \quad (3)$$

As is clear from FIG. 5, when deviation (%) in natural frequency is 0%, electric power transmission efficiency is close to 100%. When deviation (%) in natural frequency is ±5%, electric power transmission efficiency is approximately 40%. When deviation (%) in natural frequency is ±10%, electric power transmission efficiency is approximately 10%. When deviation (%) in natural frequency is ±15%, electric power transmission efficiency is approximately 5%. Namely, it can be seen that electric power transmission efficiency can be enhanced to a practical level by setting a natural frequency of each of second coil 93 and third coil 96 such that an absolute value of deviation (%) in natural frequency (difference in natural frequency) is not greater than 10% of the natural frequency of third coil 96. In addition, electric power transmission efficiency can further be enhanced by setting a natural frequency of each of second coil 93 and third coil 96 such that an absolute value of deviation (%) in natural frequency is not higher than 5% of the natural frequency of third coil 96, which is further preferred. It is noted that electromagnetic field analysis software (JMAG (trademark): manufactured by JSOL Corporation)) is adopted as simulation software.

Referring again to FIG. 2, electric power transmission unit 220 of electric power transmission equipment 200 and electric power reception unit 110 of vehicle 100 supply and receive electric power in a non-contact manner through at least one of magnetic field formed between electric power transmission unit 220 and electric power reception unit 110 and oscillating at a specific frequency and electric field formed between electric power transmission unit 220 and electric power reception unit 110 and oscillating at a specific frequency. A coupling coefficient κ between electric power transmission unit 220 and electric power reception unit 110 is preferably not greater than 0.1, and by causing electric power transmission unit 220 and electric power reception unit 110 to resonate through electromagnetic field, electric power is transmitted from electric power transmission unit 220 to electric power reception unit 110.

Here, magnetic field at a specific frequency formed around electric power transmission unit 220 will be described. "Magnetic field at a specific frequency" typically has relationship with electric power transmission efficiency and a frequency of a current supplied to electric power transmission unit 220. Therefore, initially, relation between electric power transmission efficiency and a frequency of a current supplied to electric power transmission unit 220 will be described. Electric power transmission efficiency at the time when electric power is transmitted from electric power transmission unit 220 to electric power reception unit 110 varies depending on various factors such as a distance between electric power transmission unit 220 and electric power reception unit 110. For example, a natural frequency (resonance frequency) of electric power transmission unit 220 and electric power reception unit 110 is defined as f0, a frequency of a current supplied to electric power transmission unit 220 is defined as f3, and an air gap between electric power transmission unit 220 and electric power reception unit 110 is defined as an air gap AG.

Figure 6:
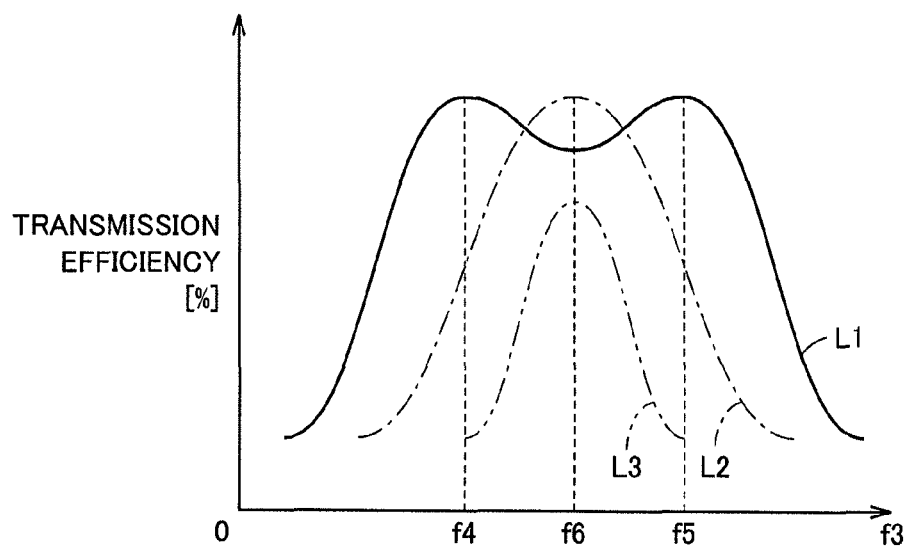
FIG. 6 is a graph showing relation between electric power transmission efficiency at the time when an air gap is varied while a natural frequency is fixed and a frequency of a current supplied to an electric power transmission unit.

FIG. 6 is a graph showing relation between electric power transmission efficiency at the time when air gap AG is varied while natural frequency f0 is fixed and frequency f3 of a current supplied to electric power transmission unit 220. Referring to FIG. 6, the abscissa represents frequency f3 of a current supplied to electric power transmission unit 220 and the ordinate represents electric power transmission efficiency (%). An efficiency curve L1 schematically shows relation between electric power transmission efficiency at the time when air gap AG is small and frequency f3 of a current supplied to electric power transmission unit 220. As shown with this efficiency curve L1, when air gap AG is small, a peak of electric power transmission efficiency appears at frequencies f4, f5 (f4<f5). As air gap AG is increased, two peaks at which electric power transmission efficiency is high are varied to be close to each other. Then, as shown with an efficiency curve L2, when air gap AG is greater than a prescribed distance, one peak of electric power transmission efficiency appears, and electric power transmission efficiency attains to a peak when a frequency of a current supplied to electric power transmission unit 220 attains to a frequency f6. As air gap AG is further increased as compared with the state shown with efficiency curve L2, the peak of electric power transmission efficiency is lower as shown with an efficiency curve L3.

For example, a technique as follows is possible as a technique for improving electric power transmission efficiency. As a first technique, a technique of varying characteristics of electric power transmission efficiency between electric power transmission unit 220 and electric power reception unit 110 by maintaining a frequency of a current supplied to electric power transmission unit 220 constant in accordance with air gap AG and varying a capacitance of capacitor 222 or capacitor 112 is possible. Specifically, capacitances of capacitor 222 and capacitor 112 are adjusted such that electric power transmission efficiency attains to peak while a frequency of a current supplied to electric power transmission unit 220 is maintained constant. With this technique, regardless of a size of air gap AG, a frequency of a current which flows through electric power transmission unit 220 and electric power reception unit 110 is constant. It is noted that a technique of making use of matching device 260 of electric power transmission equipment 200, a technique of making use of a converter (not shown) provided between rectifier 180 and power storage device 190 in vehicle 100, or the like can also be adopted as a technique of varying characteristics of electric power transmission efficiency.

A second technique is a technique of adjusting a frequency of a current supplied to electric power transmission unit 220 based on a size of air gap AG. For example, in a case where electric power transmission characteristics exhibit efficiency curve L1, a current having a frequency of f4 or f5 is supplied to electric power transmission unit 220. Then, in a case where frequency characteristics exhibit efficiency curve L2, L3, a current having frequency f6 is supplied to electric power transmission unit 220. In this case, a frequency of a current which flows through electric power transmission unit 220 and electric power reception unit 110 is varied in accordance with a size of air gap AG.

With the first technique, a frequency of a current which flows through electric power transmission unit 220 attains to a fixed constant frequency, and with the second technique, a frequency which flows through electric power transmission unit 220 attains to a frequency which varies as appropriate depending on air gap AG. With the first technique, the second technique, or the like, a current at a specific frequency set to achieve high electric power transmission efficiency is supplied to electric power transmission unit 220. As a current at a specific frequency flows through electric power transmission unit 220, magnetic field (electromagnetic field) oscillating at a specific frequency is formed around electric power transmission unit 220. Electric power reception unit 110 receives electric power from electric power transmission unit 220 through magnetic field formed between electric power reception unit 110 and electric power transmission unit 220 and oscillating at a specific frequency. Therefore, "magnetic field oscillating at a specific frequency" is not necessarily magnetic field at a fixed frequency. Though a frequency of a current supplied to electric power transmission unit 220 is set with attention being paid to air gap AG in the example above, electric power transmission efficiency is varied also by other factors such as displacement in a horizontal direction of electric power transmission unit 220 and electric power reception unit 110, and a frequency of a current supplied to electric power transmission unit 220 may be adjusted based on those other factors.

Though an example in which a helical coil is adopted for a resonance coil has been described in the description above, in a case where an antenna such as a meandering line is adopted for a resonance coil, a current at a specific frequency flows through electric power transmission unit 220 and thus electric field at a specific frequency is formed around electric power transmission unit 220. Then, electric power is transmitted between electric power transmission unit 220 and electric power reception unit 110 through this electric field.

In this electric power transmission system, near field (evanescent field) where "static electromagnetic field" of electromagnetic field is dominant is made use of in order to improve efficiency in transmission and reception of electric power.

Figure 7:
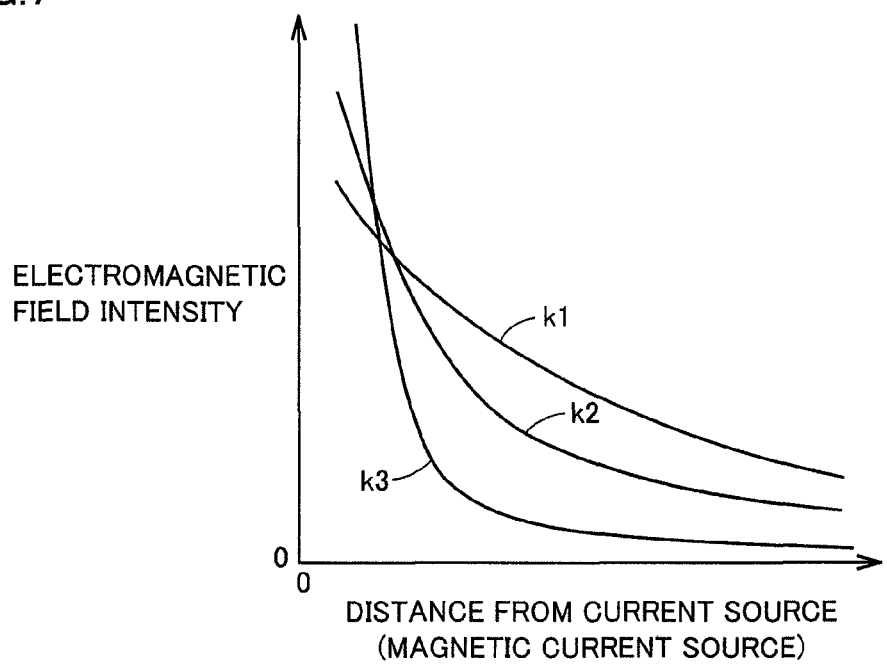
FIG. 7 is a diagram showing relation between a distance from a current source (magnetic current source) and electromagnetic field intensity.

FIG. 7 is a diagram showing relation between a distance from a current source (magnetic current source) and electromagnetic field intensity. Referring to FIG. 7, electromagnetic field is constituted of three components. A curve k1 represents a component inversely proportional to a distance from a wave source and it is referred to as "radiation electromagnetic field." A curve k2 represents a component inversely proportional to a square of a distance from a wave source and it is referred to as "induction electromagnetic field." In addition, a curve k3 represents a component inversely proportional to a cube of a distance from a wave source and it is referred to as "static electromagnetic field." It is noted that, with a wavelength of electromagnetic field being denoted as "λ", a distance at which "radiation electromagnetic field," "induction electromagnetic field," and "static electromagnetic field" are substantially equal in intensity can be expressed as $\lambda/2\pi$.

"Static electromagnetic field" is an area where intensity of electromagnetic waves sharply decreases with a distance from the wave source, and in the electric power transmission system according to this embodiment, near field (evanescent field) where this "static electromagnetic field" is dominant is made use of for transmitting energy (electric power). Namely, electric power transmission unit 220 and electric power reception unit 110 (for example, a pair of LC resonance coils) having close natural frequencies are caused to resonate in near field where "static electromagnetic field" is dominant, so that energy (electric power) is transmitted from electric power transmission unit 220 to the other electric power reception unit 110. Since this "static electromagnetic field" does not propagate energy over a long distance, a resonant method can achieve electric power transmission with less energy loss than electromagnetic waves transmitting energy (electric power) by means of the "radiation electromagnetic field" propagating energy over a long distance.

Thus, in this electric power transmission system, electric power is transmitted between electric power transmission unit 220 and electric power reception unit 110 in a non-contact manner by causing electric power transmission unit 220 and electric power reception unit 110 to resonate through electromagnetic field. A coupling coefficient (κ) between electric power transmission unit 220 and electric power reception unit 110 is, for example, approximately not greater than 0.3 and preferably not greater than 0.1. Naturally, a coupling coefficient (κ) in a range approximately from 0.1 to 0.3 can also be adopted. A coupling coefficient (κ) is not limited to such a value and it can take various values at which good electric power transmission is achieved.

Coupling between electric power transmission unit 220 and electric power reception unit 110 as above in electric power transmission is referred to, for example, as "magnetic resonant coupling," "magnetic field resonant coupling," "magnetic field resonance (resonant) coupling," "near field resonance (resonant) coupling," "electromagnetic field resonance coupling," or "electric field resonance coupling." "Electromagnetic field resonance coupling" means coupling including any of "magnetic resonant coupling," "magnetic field resonant coupling," and "electric field resonance coupling."

In a case where electric power transmission unit 220 and electric power reception unit 110 are formed from coils as above, electric power transmission unit 220 and electric power reception unit 110 are coupled to each other mainly through magnetic field, and "magnetic resonant coupling" or "magnetic field resonant coupling" is formed. It is noted that, for example, an antenna such as a meandering line can also be adopted for electric power transmission unit 220 and electric power reception unit 110, and in this case, electric power transmission unit 220 and electric power reception unit 110 are coupled to each other mainly through electric field and "electric field resonant coupling" is formed.

(Description of Verification Control of Pairing Between Electric Power Transmission Equipment and Vehicle)

In the vehicle electric power feed system in which electric power is conveyed in a non-contact manner as described above, wired connection for electric power conveyance between the electric power transmission equipment and the vehicle is not made. Therefore, in many cases, information is also conveyed between the electric power transmission equipment and the vehicle through radio communication, and authentication is carried out in the electric power transmission equipment and the vehicle based on information obtained through radio communication.

In radio communication, in a case where a plurality of pieces of equipment (vehicles, electric power transmission equipment) capable of communicating are present within communication coverage, individual communication with each piece of equipment can be established. Therefore, in a case as in FIG. 1 where the non-contact electric power feed system as above is provided in a plurality of adjacent parking spaces such as a parking lot of a commercial facility, electric power transmission equipment can communicate with a plurality of vehicles and a vehicle can communicate with a plurality of pieces of electric power transmission equipment.

Then, for each piece of equipment, there will be a plurality of pieces of counterpart equipment which could be an electric power transmission target or an electric power reception target. Therefore, in order to appropriately supply electric power from electric power transmission equipment to a vehicle, counterpart equipment to or from which electric power should be transmitted or received should reliably be specified and pairing with the same should be made.

If an electric power transmission operation is performed while electric power transmission equipment and a vehicle are not correctly paired, the electric power transmission equipment cannot correctly know a state of a power storage device mounted on a vehicle, and electric power transmission in accordance with a state of a power storage device of another vehicle is carried out. Then, there is a possibility of insufficient charge of the power storage device or overcharge due to failure in appropriate stop of charging. Thus, charging as intended by a user may fail, or failure or degradation of equipment may be caused.

In charging a power storage device with a public electric power transmission device, fees may be charged in accordance with an amount of charge. Therefore, if electric power transmission equipment and a vehicle are not correctly paired, information on fees to the vehicle and information on fees charged to another vehicle may be interchanged.

Then, in the present first embodiment, verification control is carried out, in which transmitted electric power is intentionally varied during an operation for electric power transmission from electric power transmission equipment to a vehicle, and based on whether or not such variation can appropriately be grasped by the vehicle, pairing between the vehicle and the electric power transmission equipment is verified. With such control, even though an electric power transmission operation has been started while the electric power transmission equipment and the vehicle are not correctly paired, inappropriate pairing can be detected during electric power transmission.

Furthermore, when incorrect pairing is detected, modification to correct pairing is made and information on electric power transmission such as fee charge information is applied to modified, correct pairing, so that electric power transmission records so far can appropriately be taken over.

Figure 8:
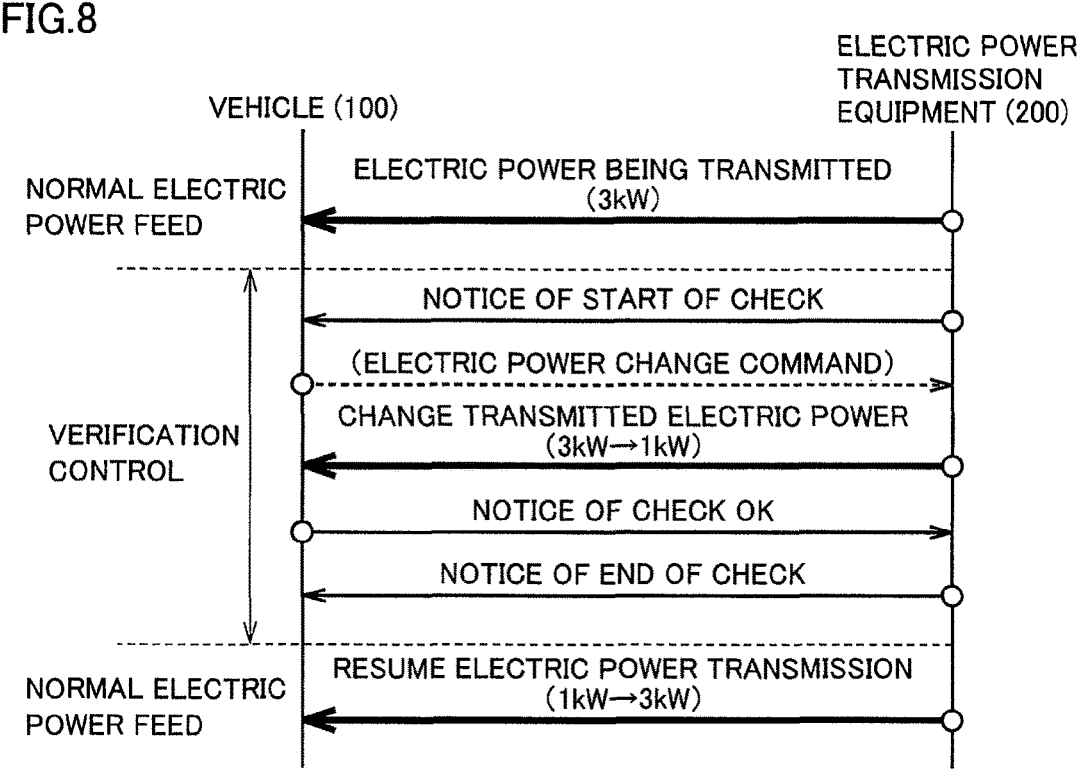
FIG. 8 is a diagram for illustrating a schematic communication sequence in a case where pairing between electric power transmission equipment and a vehicle is normal in the first embodiment.

FIG. 8 is a diagram for illustrating a schematic communication sequence in a case where pairing between electric power transmission equipment 200 and vehicle 100 is normal in the first embodiment.

Referring to FIG. 8, normal electric power feed from electric power transmission equipment 200 to vehicle 100, such as transmission of electric power of 3 kW from electric power transmission equipment 200 to vehicle 100, is considered. Then, for example, verification control is started after lapse of a predetermined time period since start of electric power transmission or at prescribed time intervals.

As verification control is started, initially, an advance notice to the effect that check in verification control is started is given from electric power transmission equipment 200 to vehicle 100 currently specified as an electric power transmission target through radio communication. Thus, vehicle 100 recognizes that electric power from electric power transmission equipment 200 will be changed.

In response to this notice, vehicle 100 outputs an electric power change command to electric power transmission equipment 200. Then, electric power transmission equipment 200 lowers transmitted electric power, for example, from current 3 kW to 1 kW. This electric power change is made by varying at least one of an electric power transmission current and an electric power transmission voltage.

Here, though variation in transmitted electric power is detected in vehicle 100, an advance notice of start of verification control has been given, and hence vehicle 100 determines that this electric power variation is due to verification control and pairing with electric power transmission equipment 200 is correct.

Then, vehicle 100 transmits a signal indicating that pairing is correct to electric power transmission equipment 200. In response thereto, electric power transmission equipment 200 gives a notice of end of verification control to vehicle 100, and resumes normal electric power feed, with transmitted electric power being recovered from 1 kW to 3 kW.

An electric power change command from vehicle 100 in response to an advance notice of verification control from electric power transmission equipment 200 is not necessarily required in FIG. 8, and electric power transmission equipment 200 itself may change electric power in response to the fact that a prescribed condition is satisfied (for example, lapse of a prescribed period of time) after an advance notice was output.

Figure 9:
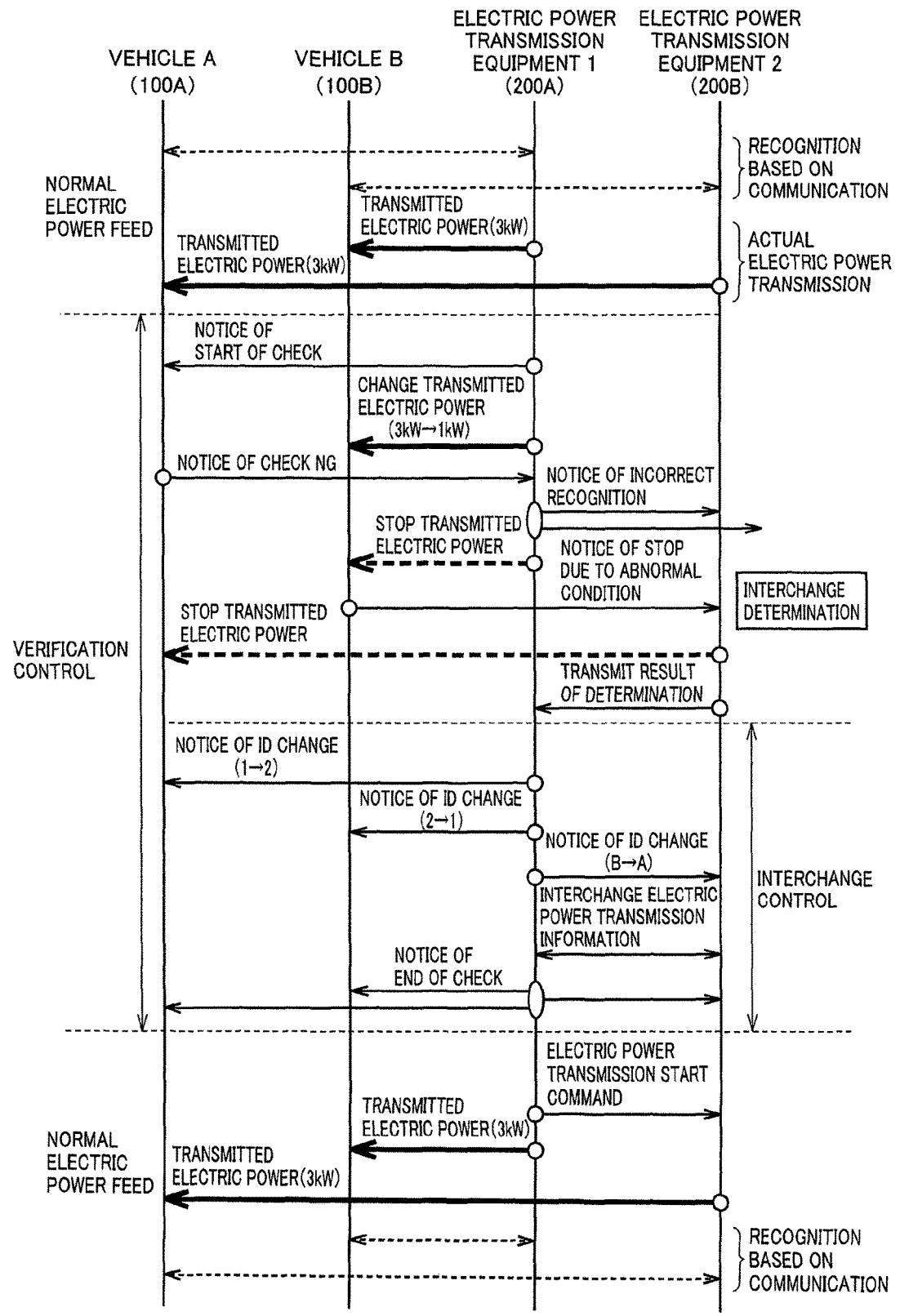
FIG. 9 is a diagram for illustrating a schematic communication sequence in a case where pairing between electric power transmission equipment and a vehicle is abnormal in the first embodiment.

A schematic communication sequence in a case where pairing between electric power transmission equipment and a vehicle is abnormal will now be described with reference to FIG. 9. In FIG. 9, through radio communication, it is recognized that electric power transmission equipment 200A (electric power transmission equipment 1) and vehicle 100A (vehicle A) in FIG. 1 are paired and electric power transmission equipment 200B (electric power transmission equipment 2) and vehicle 100B (vehicle B) are paired. Actually, however, vehicle A is parked in a parking space of electric power transmission equipment 2, and electric power is supplied from electric power transmission equipment 2 to vehicle A. On the other hand, vehicle B is parked in a parking space of electric power transmission equipment 1, and electric power is supplied from electric power transmission equipment 1 to vehicle B.

In such a state, when verification control is started in electric power transmission equipment 1, an advance notice of start of control is given from electric power transmission equipment 1 to vehicle A currently specified as an electric power transmission target. Then, transmitted electric power from electric power transmission equipment 1 is lowered, for example, from 3 kW to 1 kW.

Actually, however, electric power transmitted to vehicle B is lowered, and electric power received in vehicle A is not varied. Vehicle A determines that pairing is abnormal based on the fact that transmitted electric power is not changed within a prescribed period after an advance notice was received from electric power transmission equipment 1. Then, vehicle A gives a notice indicating abnormal pairing to electric power transmission equipment 1.

When electric power transmission equipment 1 recognizes incorrect recognition of pairing in response to a notice of an abnormal condition from vehicle A, it gives a notice indicating that incorrect recognition has occurred to other electric power transmission equipment and stops electric power transmission.

Vehicle B transmits a notice of stop due to an abnormal condition to electric power transmission equipment 2 because of sudden stop of electric power transmission without an advance notice. Electric power transmission equipment 2 determines that recognition of pairing in electric power transmission equipment 1 and recognition of pairing in electric power transmission equipment 2 are reverse, based on reception of a notice of stop due to an abnormal condition from vehicle B and a notice of incorrect recognition from electric power transmission equipment 1 in spite of electric power transmission being carried out. Then, electric power transmission equipment 2 stops transmitted electric power.

Though not shown in FIG. 9, a notice of an abnormal condition may be given to electric power transmission equipment 2 if transmitted electric power is lowered in vehicle B without an advance notice.

Thereafter, electric power transmission equipment 1 gives a notice to indicate change in a currently recognized ID to vehicles A and B and electric power transmission equipment 2, based on a result of determination in electric power transmission equipment 2. In electric power transmission equipment 1 as well, a recognized ID of a vehicle is changed. Thus, pairing in each piece of equipment is rectified. A notice of stop due to an abnormal condition from vehicle B or a result of determination by electric power transmission equipment 2 in response thereto corresponds to "information originating from variation in transmitted electric power" in the present invention.

Thereafter, information on electric power transmission so far to vehicles A and B is interchanged between electric power transmission equipment 1 and electric power transmission equipment 2. Thus, SOC or fee charge information of a power storage device mounted on a vehicle to which electric power is to be transmitted is appropriately recognized.

Then, electric power transmission equipment 1 transmits a notice indicating end of verification control to vehicles A and B and electric power transmission equipment 2, and transmits a command to resume electric power transmission to electric power transmission equipment 2.

Thereafter, supply of electric power from electric power transmission equipment 1 and electric power transmission equipment 2 is started. Thus, recognition of counterpart equipment based on communication and actual equipment can be brought into correspondence. Namely, in electric power transmission equipment, an electric power transmission target vehicle to which electric power is to be transmitted from the electric power transmission equipment is appropriately specified, and in a vehicle, electric power transmission equipment which should transmit electric power to the vehicle is appropriately specified.

Figure 10:
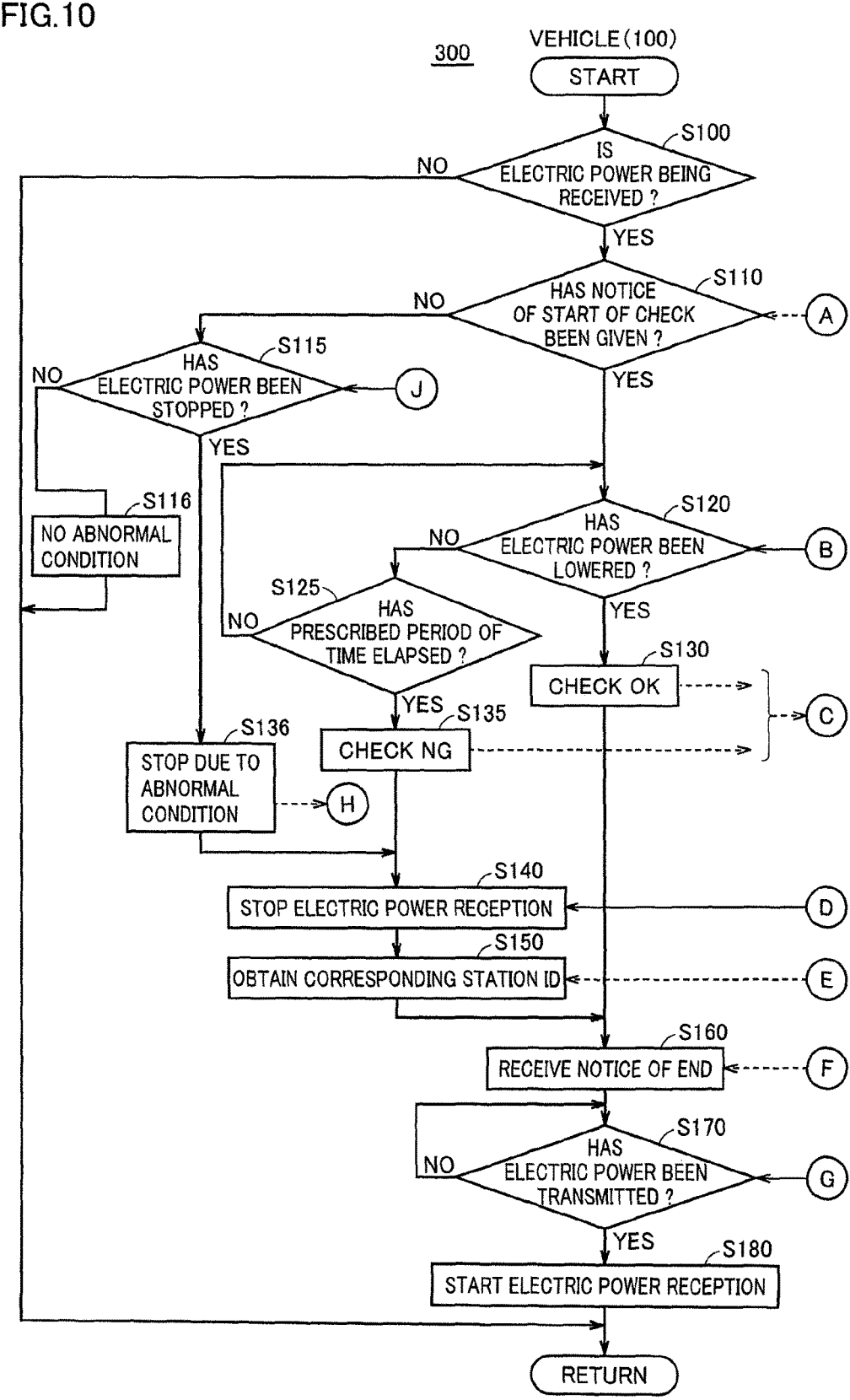
FIG. 10 is a flowchart for illustrating verification control processing performed in a vehicle ECU in the first embodiment.
Figure 11:
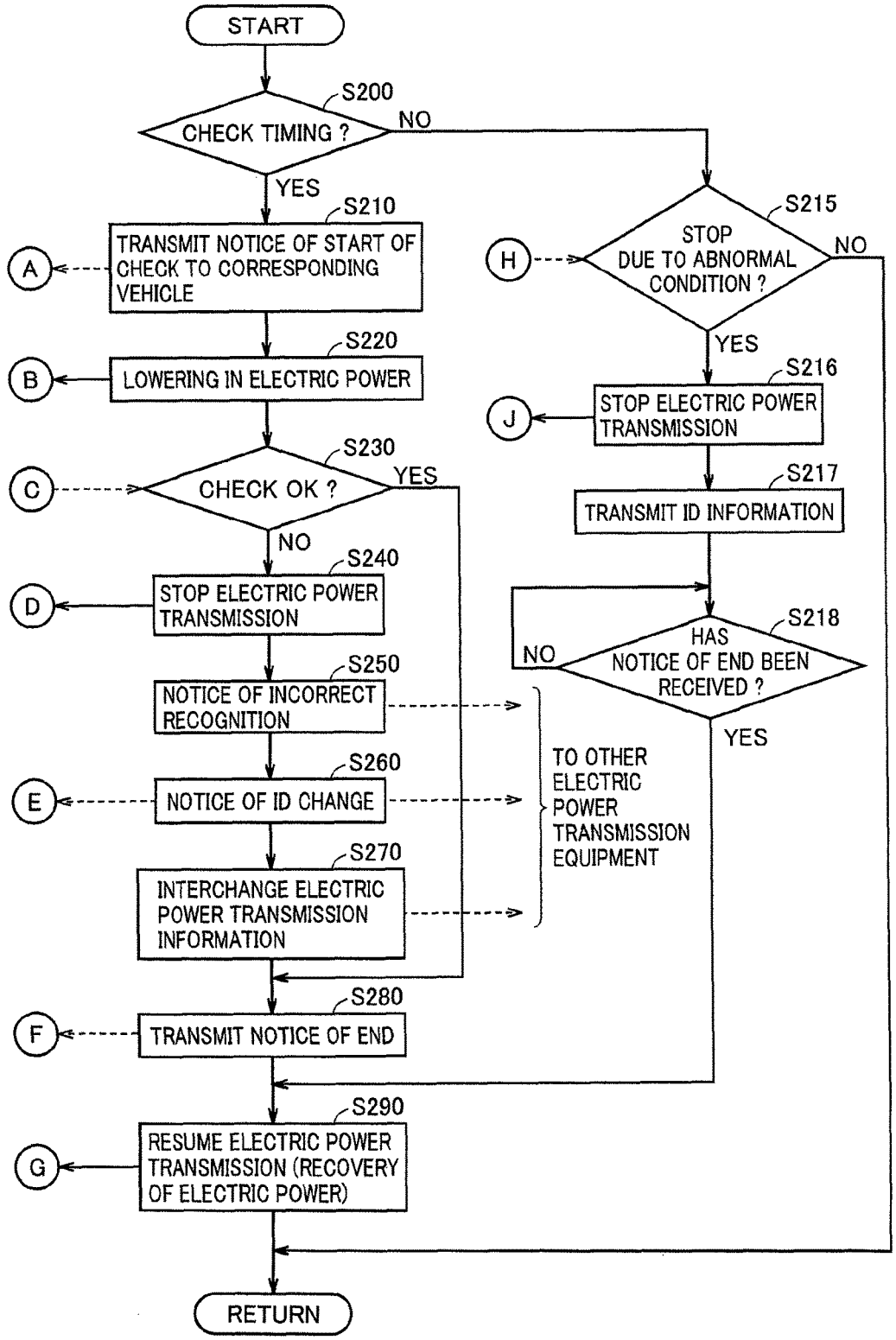
FIG. 11 is a flowchart for illustrating verification control processing performed in an electric power transmission ECU in the first embodiment.

Details of verification control processing in the first embodiment will now be described with reference to FIGS. 10 and 11. FIG. 10 is a flowchart showing processing performed in vehicle ECU 300 of vehicle 100. FIG. 11 is a flowchart showing processing performed in electric power transmission ECU 240 of electric power transmission equipment 200. Each step in the flowcharts shown in FIGS. 10 and 11 is realized as programs stored in advance in vehicle ECU 300 and electric power transmission ECU 240, respectively, are invoked from a main routine and executed in response to a prescribed period or a prescribed condition being satisfied. Alternatively, for some steps, dedicated hardware (electronic circuitry) can also be constructed to realize processing.

Referring to FIG. 10, initially, processing in vehicle 100 will be described. Vehicle ECU 300 determines whether or not electric power is currently being received in step (hereinafter a step being abbreviated as S) 100.

When electric power is not being received (NO in S100), verification of pairing is not necessary, and hence vehicle ECU 300 skips subsequent processing and the process ends.

When electric power is being received (YES in S100), the process proceeds to S110, and vehicle ECU 300 determines whether or not a notice of start of check (an advance notice) has been received from the electric power transmission equipment.

When a notice of start of check has been received (YES in S110), the process proceeds to S120, and vehicle ECU 300 further determines whether or not electric power transmitted from the electric power transmission equipment has been lowered.

When transmitted electric power from the electric power transmission equipment has been lowered (YES in S120), the process proceeds to S130. Vehicle ECU 300 determines in verification control that pairing between vehicle 100 and the electric power transmission equipment is normal, and transmits a notice indicating being normal to the electric power transmission equipment. Thereafter, when a notice of end of check is received in S160 from the electric power transmission equipment, vehicle ECU 300 verifies whether electric power is transmitted from the electric power transmission equipment (S170), and when electric power is transmitted (YES in S170), electric power reception is resumed (S180).

When transmitted electric power from the electric power transmission equipment is not lowered in S120 (NO in S120), the process proceeds to S125, and vehicle ECU 300 determines whether or not a predetermined prescribed time period has elapsed since reception of a notice of start of check.

When the prescribed time period has not yet elapsed (NO in S125), the process returns to S120. When the prescribed time period has elapsed (YES in S125), the process proceeds to S135. Vehicle ECU 300 determines that pairing between vehicle 100 and the electric power transmission equipment is abnormal, and transmits a notice to that effect to the electric power transmission equipment.

Thereafter, in response to stop of electric power transmission by the electric power transmission equipment, vehicle ECU 300 stops electric power reception (S140). Then, in S150, vehicle ECU 300 obtains an ID of electric power transmission equipment to correctly be paired from the electric power transmission equipment, and changes recognition of pairing.

Then, vehicle ECU 300 receives a notice of end of check from the electric power transmission equipment (S160), and when electric power transmission from the electric power transmission equipment is resumed (YES in S170), electric power reception is resumed (S180).

When a notice of start of check has not been received in S110 (NO in S110), the process proceeds to S115, and vehicle ECU 300 determines whether or not transmitted electric power from the electric power transmission equipment has stopped.

When transmitted electric power from the electric power transmission equipment is not stopped (NO in S115), the vehicle is not a vehicle of interest of verification control, and in addition, electric power transmission is continued. Therefore, vehicle ECU 300 determines that pairing in an electric power transmission device has not been interchanged at least with a vehicle for which verification control is carried out, and that pairing is highly likely to be normal (S116). Then, vehicle ECU 300 ends the process.

When transmitted electric power from the electric power transmission equipment has been stopped (YES in S115), transmitted electric power has suddenly stopped without a notice of start of verification control. Therefore, vehicle ECU 300 determines in S136 that stop due to an abnormal condition has occurred, and transmits a signal to that effect to the electric power transmission equipment.

Thereafter, vehicle ECU 300 stops a charging operation (S140), and obtains a notice of change in an ID from the electric power transmission equipment and makes change to correct pairing (S150).

Then, vehicle ECU 300 receives a notice of end of check from the electric power transmission equipment (S160), and when electric power transmission from the electric power transmission equipment is resumed (YES in S170), electric power reception is resumed (S180).

Processing performed in electric power transmission ECU 240 of electric power transmission equipment 200 will now be described with reference to FIG. 11.

In S200, electric power transmission ECU 240 determines whether or not timing to start verification control has come. As the timing to start verification control, for example, after lapse of a predetermined period since start of electric power transmission, every certain period, or a case where an abnormal condition of pairing is estimated from an electric power difference between transmitted electric power and received electric power can be adopted. The timing of verification control is set preferably to coincide as little as possible with the timing thereof in proximate electric power transmission equipment. For example, a value for a prescribed period may be set to be different for each piece of electric power transmission equipment, or in a configuration having an administrative server which will be described later with reference to FIG. 13, timing may be adjusted in the administrative server. Since verification control is thus prevented from being carried out in parallel in a plurality of pieces of electric power transmission equipment, the possibility that an abnormal condition can reliably be detected by carrying out verification control once can be enhanced.

When the timing to start has come (YES in S200), electric power transmission ECU 240 transmits in S210 a notice of start of check to a corresponding vehicle recognized as currently being paired. Then, electric power transmission ECU 240 lowers in S220 transmitted electric power to predetermined electric power. Electric power change in S220 is not limited to lowering in electric power but electric power may be stopped or electric power may be increased within an allowable range.

Thereafter, electric power transmission ECU 240 determines in S230 whether or not a result of check of electric power change in a paired vehicle is normal. When a result of check is normal (YES in S230), the process proceeds to S280. Electric power transmission ECU 240 gives a notice of end of verification control to the vehicle and causes electric power to be recovered to electric power at the time of normal electric power feed (S290). The process then ends.

When a result of check is abnormal (NO in S230), the process proceeds to S240, and electric power transmission ECU 240 stops electric power transmission. Then, electric power transmission ECU 240 transmits a signal indicating that incorrect recognition of pairing has occurred to other electric power transmission equipment (S250).

Electric power transmission ECU 240 selects appropriate ID information based on information from electric power transmission equipment in which recognition of pairing has interchanged owing to stop due to an abnormal condition, and transmits a notice of change in an ID to the vehicle and other electric power transmission equipment (S260). Thereafter, in S270, electric power transmission ECU 240 interchanges electric power transmission information with an electric power transmission device in which recognition of pairing has interchanged.

Then, electric power transmission ECU 240 notifies the vehicle of end of verification control, and resumes electric power transmission with electric power at the time of normal electric power feed (S290).

When the timing to start verification control has not come in S200 (NO in S200), the process proceeds to S215, and electric power transmission ECU 240 determines whether or not stop due to an abnormal condition of transmitted electric power has occurred in a paired vehicle.

When stop due to an abnormal condition of transmitted electric power has not occurred (NO in S215), electric power transmission is normally continued, and electric power transmission ECU 240 ends the process.

When stop due to an abnormal condition of transmitted electric power has occurred (YES in S215), electric power transmission ECU 240 determines that a vehicle to which electric power is currently being transmitted and a vehicle which is communicating are different from each other, and the process proceeds to S216, where transmitted electric power is stopped.

Then, electric power transmission ECU 240 determines an electric power transmission device which is a correct pairing counterpart based on a notice of incorrect recognition transmitted from other electric power transmission equipment, and changes ID information of its own and transmits that ID information to another electric power transmission device (S217).

Thereafter, when a notice of end of check from other electric power transmission equipment is received (YES in S218), the process proceeds to S290 and electric power transmission ECU 240 resumes electric power transmission.

By carrying out control in accordance with the process as above, during an electric power transmission operation, whether or not pairing between electric power transmission equipment and a vehicle which is currently recognized is normal can be determined. Then, when pairing is determined as abnormal, modification to appropriate pairing is made, and information on electric power transmission so far is accordingly interchanged between electric power transmission equipment in correspondence with appropriate pairing. Thus, insufficient charging and overcharge of a power storage device which may occur due to inappropriate pairing can be prevented, and fees involved with electric power transmission can be rectified.

A technique of specifying a vehicle and electric power transmission equipment and interchanging IDs and information thereof for interchange control of an ID and information after pairing has been determined as abnormal has been shown in FIG. 9, however, other techniques can also be adopted for this interchange control.

Figure 12:
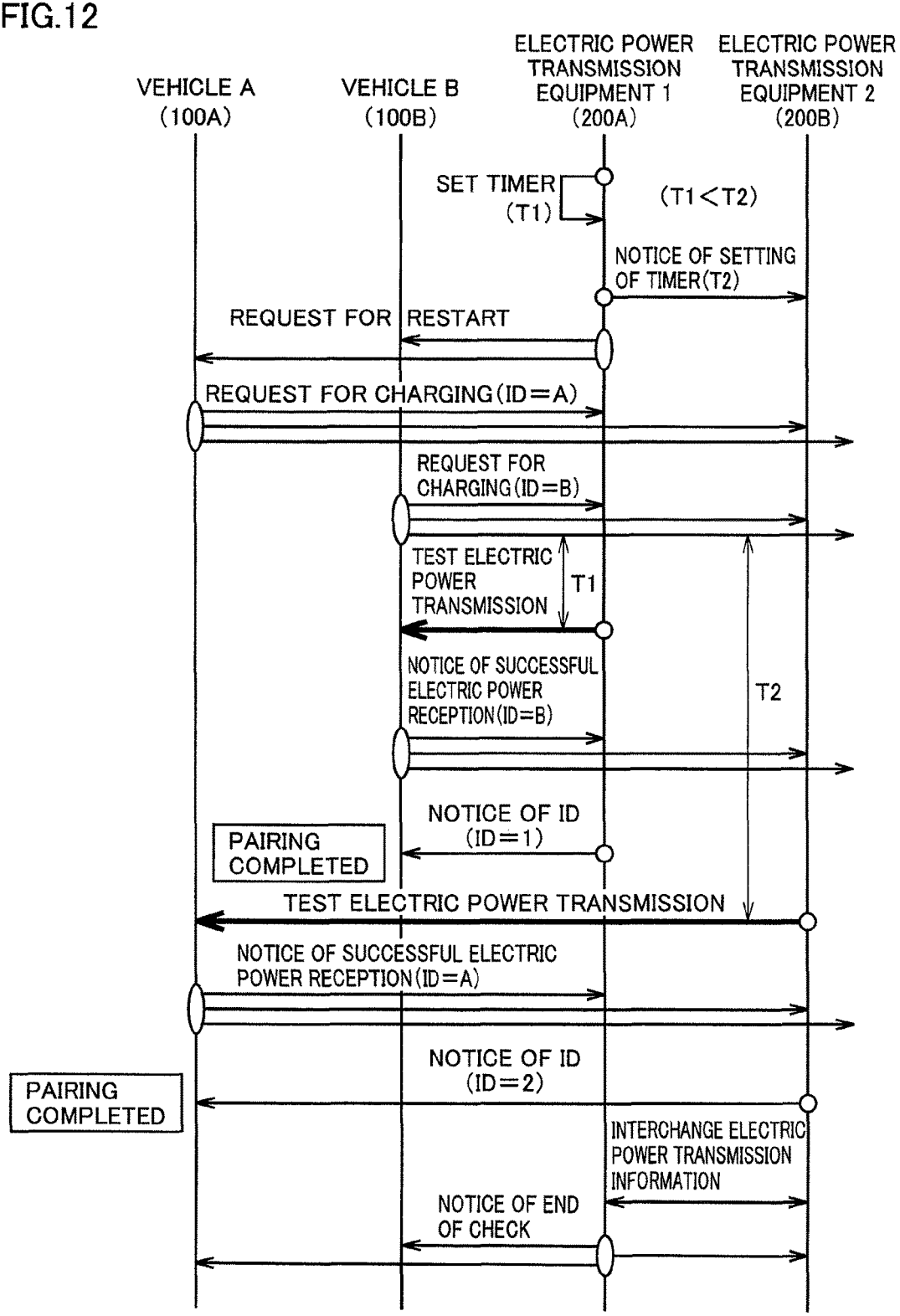
FIG. 12 is a diagram for illustrating a schematic communication sequence in another example of interchange control in FIG. 8.

Specifically, for example, as shown in FIG. 12, electric power transmission equipment corresponding to vehicles A and B of which pairing has been determined as abnormal may newly be searched for.

Referring to FIG. 12, when an abnormal condition of pairing is detected in electric power transmission equipment 1 for which verification control has been carried out, electric power transmission equipment 1 sets timer values T1 and T2 (T1<T2) for itself and for electric power transmission equipment 2, and transmits set timer value T2 to electric power transmission equipment 2. Then, a restart request signal is transmitted to vehicles A and B to have them search for electric power transmission equipment.

Vehicles A and B which have received the restart request signal do not specify counterpart electric power transmission equipment but transmit a charge request signal collectively to all pieces of electric power transmission equipment.

Electric power transmission equipment 1 substantially simultaneously receives a plurality of charge request signals from vehicles A and B, and in response thereto, at timing of lapse of timer value T1 which was determined earlier since reception of two charge request signals, carries out electric power transmission using weak electric power less than electric power used during a normal charging operation (hereinafter also referred to as "test electric power transmission"). Test electric power transmission here is carried out only from electric power transmission equipment 1.

Electric power supplied in test electric power transmission by electric power transmission equipment 1 is received by vehicle B. At this stage, since vehicle B cannot determine from which electric power transmission equipment electric power has been supplied, vehicle B does not specify counterpart electric power transmission equipment in response to reception of electric power, but collectively transmits a notice of successful electric power reception with an ID to all pieces of electric power transmission equipment.

As electric power transmission equipment 1 receives a notice of successful electric power reception from vehicle B, electric power transmission equipment 1 recognizes that electric power in test electric power transmission has been received by vehicle B and a pairing counterpart is vehicle B. Then, electric power transmission equipment 1 notifies vehicle B of an ID, and thus vehicle B also recognizes that a pairing counterpart is electric power transmission equipment 1.

Similarly, electric power transmission equipment 2 substantially simultaneously receives a plurality of charge request signals from vehicles A and B. In response thereto, electric power transmission equipment 2 carries out test electric power transmission after lapse of timer value T2 determined earlier by electric power transmission equipment 1. Electric power supplied in test electric power transmission by electric power transmission equipment 2 is received by vehicle A. Since vehicle A cannot determine at this stage from which electric power transmission equipment electric power has been received, vehicle A does not specify counterpart electric power transmission equipment in response to electric power reception, but transmits collectively a notice of successful electric power reception with ID to all pieces of electric power transmission equipment.

As electric power transmission equipment 2 receives a notice of successful electric power reception from vehicle A, electric power transmission equipment 2 recognizes that electric power in test electric power transmission has been received by vehicle A and a pairing counterpart is vehicle A. Then, electric power transmission equipment 2 notifies vehicle A of an ID, and thus vehicle A also recognizes that a pairing counterpart is electric power transmission equipment 2.

Thereafter, information on electric power transmission so far is interchanged between electric power transmission equipment 1 and electric power transmission equipment 2, and verification control ends.

Test electric power transmission above is not limited to use of weak electric power. For example, pulsed electric power may be transmitted only for a very short period of time, although magnitude of electric power is the same as in a normal charging operation.

Second Embodiment

In the first embodiment, a case in which each of a plurality of pieces of electric power transmission equipment independently controls an electric power transmission operation and communicates with a vehicle or other electric power transmission equipment has been described by way of example.

In an electric power transmission device having a plurality of pieces of electric power transmission equipment, an administrative control device for overall control (hereinafter also referred to as an "administrative server") may be provided. By providing such an administrative server, adjustment among pieces of electric power transmission equipment, for example, of the timing of test electric power transmission as described above, or supply and reception of information between pieces of electric power transmission equipment is advantageously facilitated. In particular, in a large-scale parking lot where the number of pieces of electric power transmission equipment is very large, control may become complicated if adjustment is made individually among pieces of electric power transmission equipment. Therefore, comprehensive control by an administrative server is preferred.

Figure 13:
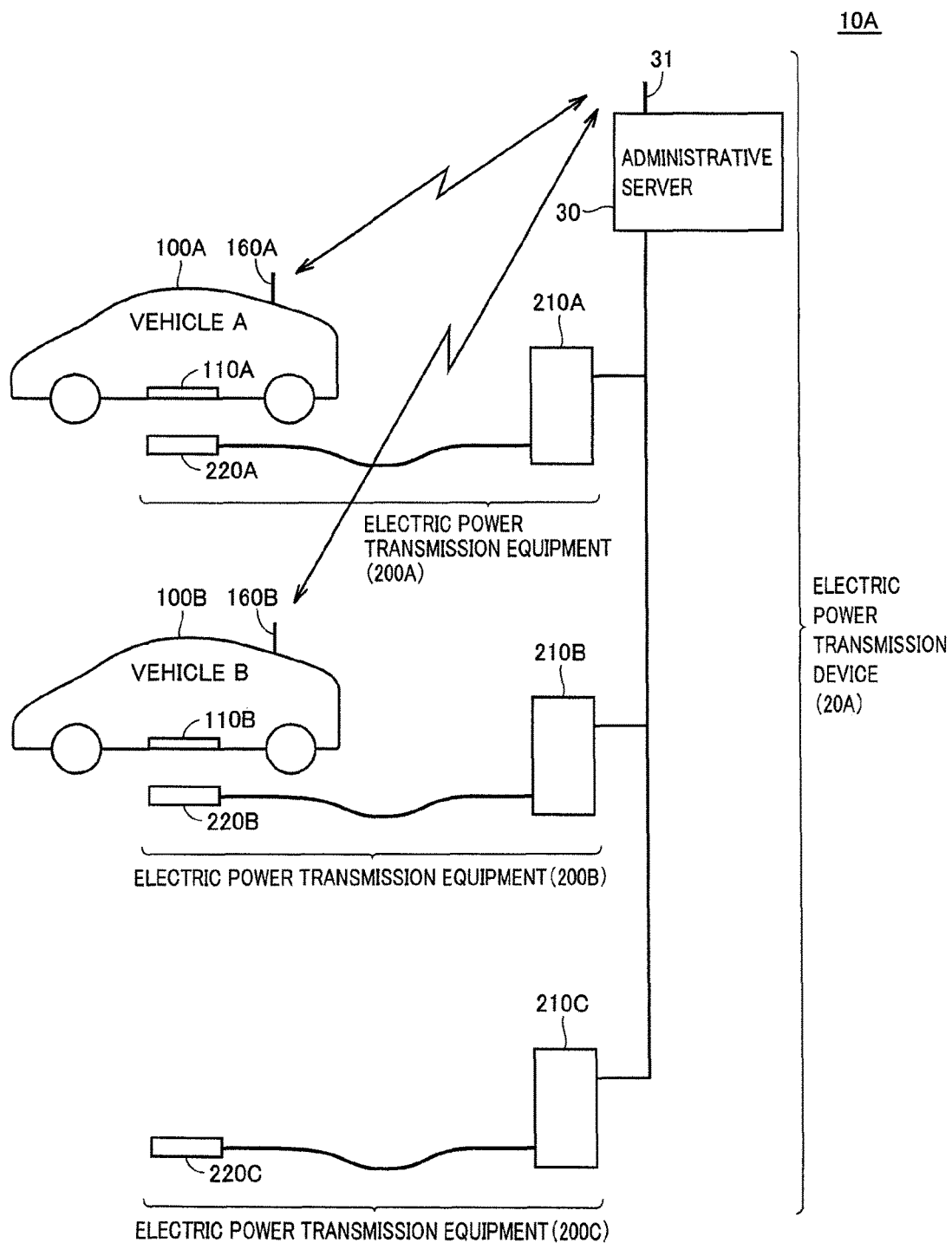
FIG. 13 is an overall configuration diagram of a vehicle electric power feed system according to a second embodiment.
Figure 14:
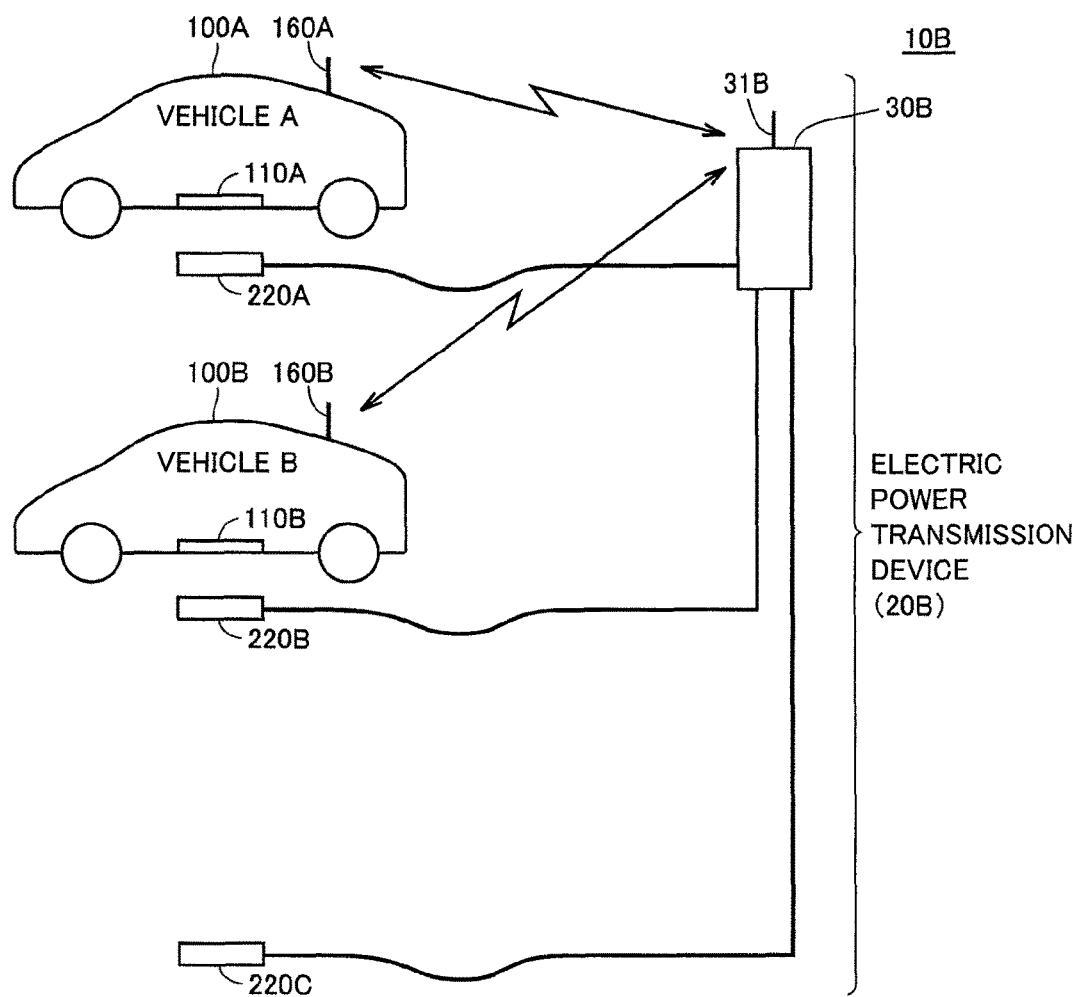
FIG. 14 is an overall configuration diagram of another example of a vehicle electric power feed system according to the second embodiment.

A configuration as shown mainly in FIGS. 13 and 14 can be adopted as a configuration having an administrative server.

An electric power transmission device 20A of a vehicle electric power feed system 10A shown in FIG. 13 is provided with an administrative server 30, in addition to electric power transmission equipment 200A, 200B, and 200C shown in FIG. 1. Administrative server 30 is connected to each piece of electric power transmission equipment through wired communication, and communicates with an electric power transmission ECU of each piece of electric power transmission equipment (FIG. 2). In this configuration, an electric power transmission ECU included in each piece of electric power transmission equipment controls individual electric power transmission equipment. Administrative server 30 carries out common control and overall control of electric power transmission equipment.

A communication unit 31 included in administrative server 30 communicates with each vehicle. Administrative server 30 receives information to be conveyed from each vehicle to electric power transmission equipment, and transmits that information to target electric power transmission equipment. Administrative server 30 receives information to be conveyed from each piece of electric power transmission equipment to a vehicle and transmits that information to a target vehicle.

In an electric power transmission device 20B shown in a vehicle electric power feed system 10B in FIG. 14, a control device 30B including a function of administrative server 30 and power supply devices 210A to 210C of electric power transmission equipment in FIG. 13 is provided. Control device 30B establishes radio communication with each vehicle and controls an electric power transmission operation in a plurality of electric power transmission units 220A to 220C.

A configuration as in FIG. 14 is effective for a relatively small-scale system, and a space for installing equipment or cost for installation can be reduced by integrating a control function and a power supply unit.

In contrast, if a configuration as in FIG. 14 is applied to a large-scale system, a cable for conveying high-frequency electric power to each electric power transmission unit can be long or an amount of software for control can be huge and complicated. Therefore, in a large-scale system, as in FIG. 13, such distributed control that an administrative server is responsible only for overall control and an electric power transmission ECU included in electric power transmission equipment controls each electric power transmission unit is preferably carried out. As a configuration intermediate between FIG. 13 and FIG. 14 above, a power supply unit and a matching device may be arranged in each piece of electric power transmission equipment and a control device included in an administrative server may control the same.

Figure 15:
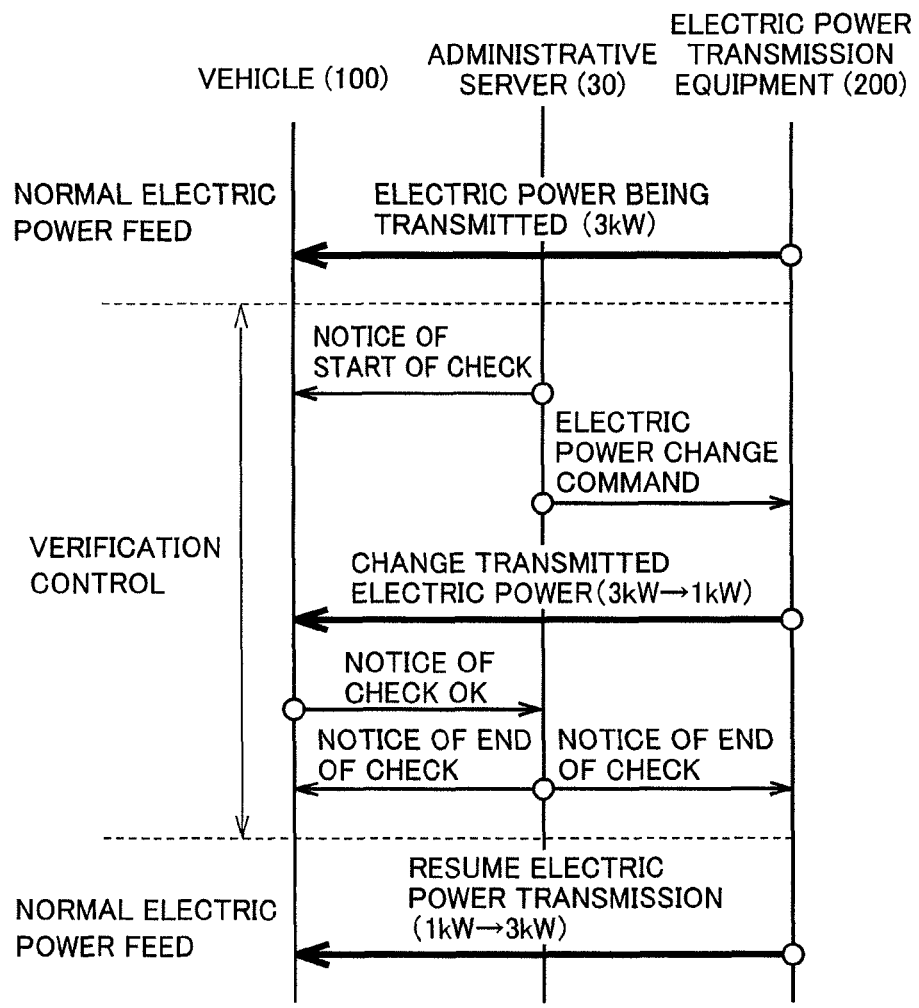
FIG. 15 is a diagram for illustrating a schematic communication sequence in a case where pairing between electric power transmission equipment and a vehicle is normal in the second embodiment.
Figure 16:
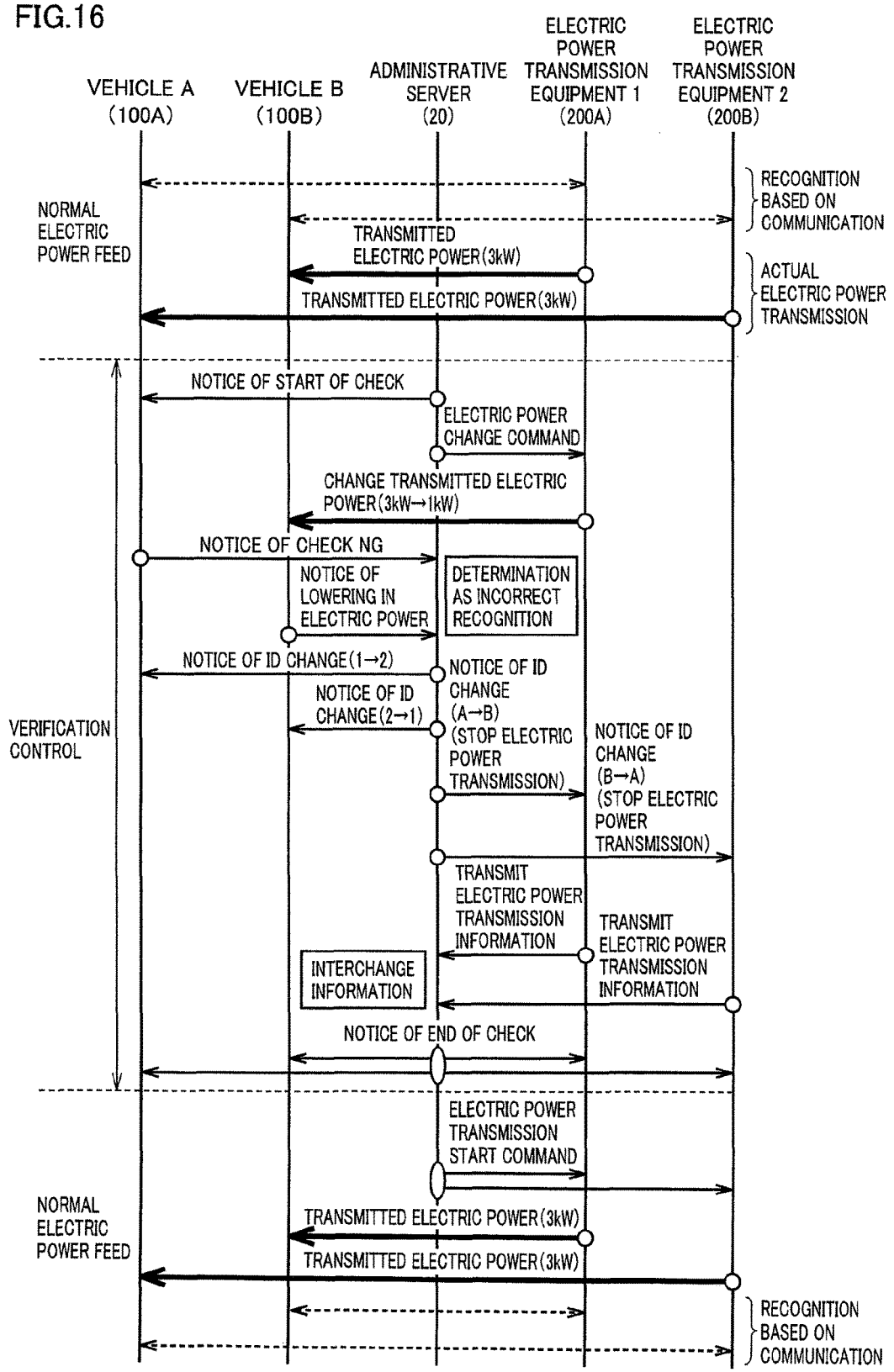
FIG. 16 is a diagram for illustrating a schematic communication sequence in a case where pairing between electric power transmission equipment and a vehicle is abnormal in the second embodiment.

A schematic communication sequence in verification control of pairing in a case of the configuration as in FIG. 13 having an administrative server will now be described with reference to FIGS. 15 and 16. FIG. 15 shows a communication sequence in a case where pairing is normal, which corresponds to FIG. 8 in the first embodiment. FIG. 16 shows a communication sequence in a case where pairing is abnormal, which corresponds to FIG. 9 in the first embodiment.

FIG. 15 is different from FIG. 8 in that information is conveyed between vehicle 100 and electric power transmission equipment 200 through administrative server 30.

Namely, when timing of verification control comes during electric power transmission, administrative server 30 gives an advance notice of start of check to vehicle 100 of interest for which verification control is to be carried out, and transmits a notice of electric power change to electric power transmission equipment 200, pairing with which is currently recognized.

In response to this notice of electric power change, electric power transmission equipment 200 changes transmitted electric power, for example, from 3 kW to 1 kW. Since pairing is normal in a case of FIG. 15, variation in transmitted electric power is detected in vehicle 100, and vehicle 100 transmits information indicating that pairing is correct to administrative server 30.

Administrative server 30 determines that pairing is normal based on the information from vehicle 100, and notifies vehicle 100 and electric power transmission equipment 200 of end of verification control. Thereafter, electric power from electric power transmission equipment 200 recovers, for example, from 1 kW to 3 kW, and normal electric power feed is resumed.

FIG. 16 is different from FIG. 9 in the first embodiment in that information is again conveyed between a vehicle and electric power transmission equipment through administrative server 30. Therefore, though detailed description of each communication sequence with reference to FIG. 16 will not be repeated, a command to each vehicle and each piece of electric power transmission equipment is transmitted from administrative server 30 as in FIG. 15.

Determination as to an abnormal condition of pairing, notification of ID change, and interchange of electric power transmission information are also carried out by administrative server 30.

Thus, in such a configuration that an administrative server for overall control of a plurality of pieces of electric power transmission equipment is provided as well, as in the first embodiment, whether or not pairing between electric power transmission equipment and a vehicle which is currently recognized is normal can be determined during an electric power transmission operation, and when pairing is abnormal, modification to appropriate pairing can be made.

The configuration as in FIG. 12 can also be applied to control for interchange of an ID and information also in FIG. 16.

Third Embodiment

In the first and second embodiments, a configuration that an electric power transmission device determines an abnormal condition of pairing has been described.

In a third embodiment, a configuration that a vehicle is mainly an entity which determines an abnormal condition of pairing will be described.

Figure 17:
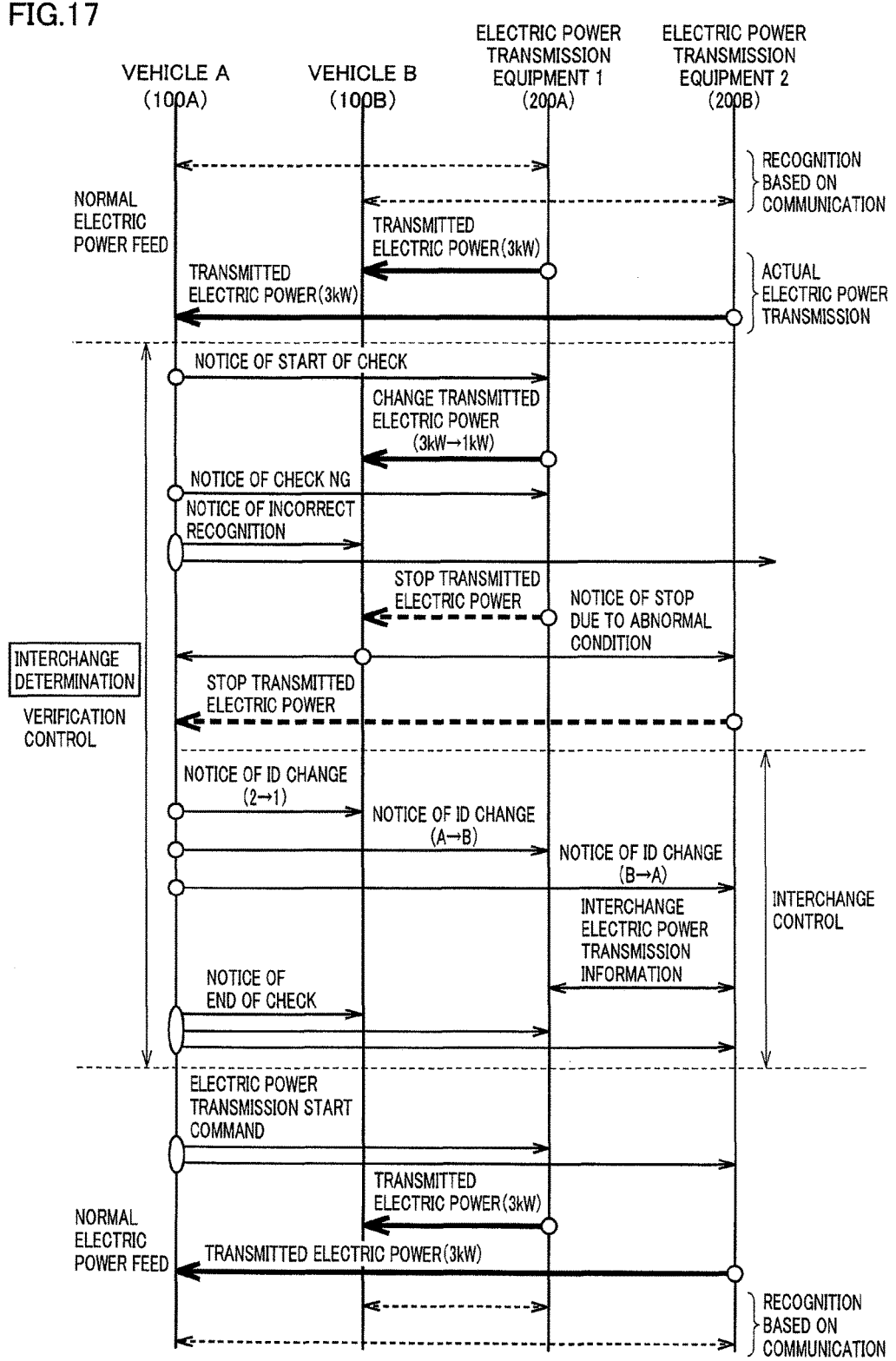
FIG. 17 is a diagram for illustrating a schematic communication sequence in a case where pairing between electric power transmission equipment and a vehicle is abnormal in a third embodiment.

FIG. 17 is a diagram for illustrating a schematic communication sequence in a case where pairing between electric power transmission equipment and a vehicle is abnormal in the third embodiment. In FIG. 17 as well, similarly to the first and second embodiments, it is recognized through communication that vehicle A is paired with electric power transmission equipment 1 and vehicle B is paired with electric power transmission equipment 2, however, actually, electric power is transmitted from electric power transmission equipment 1 to vehicle B and from electric power transmission equipment 2 to vehicle A.

Referring to FIG. 17, in response to the fact that prescribed verification timing has come during an electric power transmission operation, vehicle A gives a notice of start of verification control to electric power transmission equipment 1. In response to this notice, electric power transmission equipment 1 lowers transmitted electric power, for example, from 3 kW to 1 kW.

Electric power, however is transmitted from electric power transmission equipment 1 to vehicle B. Therefore, lowering in transmitted electric power is not detected in vehicle A, and hence vehicle A thus recognizes that pairing is abnormal. Then, vehicle A notifies electric power transmission equipment 1 of information indicating that pairing is abnormal and notifies another vehicle and electric power transmission equipment of occurrence of incorrect recognition of pairing. Then, electric power transmission equipment 1 stops electric power transmission in response to a notice of an abnormal condition from vehicle A.

Here, since transmitted electric power suddenly stops in vehicle B, vehicle B transmits a notice indicating stop due to an abnormal condition to vehicle A and electric power transmission equipment 2. In response thereto, electric power transmission equipment 2 stops electric power transmission.

Vehicle A thus recognizes that electric power transmission equipment 2 is the electric power transmission equipment corresponding to vehicle A. Then, vehicle A transmits a notice of ID change to vehicle B and electric power transmission equipment 1 and 2. Each piece of equipment changes recognition of counterpart equipment in accordance with the notice of ID change from vehicle A. Thus, correct pairing is made.

Thereafter, information on electric power transmission is interchanged between electric power transmission equipment 1 and electric power transmission equipment 2. Then, vehicle A notifies each piece of equipment of end of verification control and a command to start electric power transmission, and electric power transmission is resumed with correct pairing being set.

With such a configuration, a vehicle can determine whether or not pairing between electric power transmission equipment and a vehicle which is currently recognized is normal during an electric power transmission operation, and when pairing is abnormal, modification to appropriate pairing can be made.

In a case where an electric power transmission device has an overall administrative server as in the second embodiment as well, a vehicle may detect abnormal pairing subjectively as in the third embodiment.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10, 10A, 10B vehicle electric power feed system; 20, 20A, 20B electric power transmission device; 30, 30B administrative server; 31, 160, 230, 230A to 230C communication unit; 89 electric power transmission system; 90, 220 electric power transmission unit; 91, 110 electric power reception unit; 92, 93, 96, 97 coil; 94, 99, 111, 221 resonance coil; 95, 98, 112, 222 capacitor; 100, 100A, 100B vehicle; 113, 223 electromagnetic induction coil; 115 SMR; 118 electric load device; 120 PCU; 130 motor generator; 140 motive power transmission gear; 150 drive wheel; 155 drive device; CHR 170; 180 rectifier; 190 power storage device; 195 voltage sensor; 196 current sensor; 200, 200A to 200C electric power transmission equipment; 210, 210A to 210C power supply device; 250 power supply unit; 260 matching device; 270 vehicle detection unit; 300 vehicle ECU; and 400 commercial power supply.

The invention claimed is:

1. An electric power transmission device for supplying electric power to an electric power reception device in a non-contact manner, comprising:
   an electric power transmission unit capable of supplying electric power to the electric power reception device in a non-contact manner;
   a communication unit for radio communication with the electric power reception device; and
   a control device for controlling the electric power transmission unit,
   the control device determining whether a specified electric power reception device is an electric power reception device to which electric power is to be transmitted from the electric power transmission unit based on information from the electric power reception device specified as an electric power transmission target through radio communication by the communication unit, when electric power transmitted from the electric power transmission unit is varied while the electric power transmission unit transmits electric power.

2. The electric power transmission device according to claim 1, wherein
the control device determines that the specified electric power reception device is the electric power reception device to which electric power is to be transmitted from the electric power transmission unit when information corresponding to variation in the transmitted electric power has been received from the specified electric power reception device.

3. The electric power transmission device according to claim 1, wherein
the control device determines that the specified electric power reception device is not the electric power reception device to which electric power is to be transmitted from the electric power transmission unit when information corresponding to variation in the transmitted electric power has not been received from the specified electric power reception device.

4. The electric power transmission device according to claim 3, wherein
the control device determines that another electric power reception device is the electric power reception device to which electric power is to be transmitted from the electric power transmission unit, when information originating from variation in the transmitted electric power has been received from the another electric power reception device not specified as the electric power transmission target in the communication unit when the transmitted electric power from the electric power transmission unit is varied.

5. The electric power transmission device according to claim 4, further comprising another electric power transmission unit different from the electric power transmission unit, wherein
the control device causes information on electric power transmission by the electric power transmission unit to be stored, and
the control device interchanges stored information on electric power transmission by the electric power transmission unit with information on electric power transmission by the another electric power transmission unit, when it is determined that the another electric power reception device is the electric power reception device to which electric power is to be transmitted from the electric power transmission unit and when the another electric power transmission unit has transmitted electric power to the specified electric power reception device.

6. The electric power transmission device according to claim 1, wherein
the control device changes the transmitted electric power by varying at least one of a current and a voltage.

7. The electric power transmission device according to claim 1, wherein
the electric power reception device includes an electric power reception unit for receiving electric power from the electric power transmission device in a non-contact manner, and
a difference in natural frequency between the electric power transmission unit and the electric power reception unit is not greater than ±10% of the natural frequency of the electric power transmission unit or the natural frequency of the electric power reception unit.

8. The electric power transmission device according to claim 1, wherein
the electric power reception device includes an electric power reception unit receiving electric power from the electric power transmission device in a non-contact manner, and
a coefficient of coupling between the electric power transmission unit and the electric power reception unit is not greater than 0.1.

9. The electric power transmission device according to claim 1, wherein
the electric power reception device includes an electric power reception unit receiving electric power from the electric power transmission device in a non-contact manner, and
the electric power reception unit receives electric power from the electric power transmission unit through at least one of magnetic field formed between the electric power reception unit and the electric power transmission unit and oscillating at a specific frequency, and electric field formed between the electric power reception unit and the electric power transmission unit and oscillating at a specific frequency.

10. An electric power transmission device for supplying electric power to an electric power reception device in a non-contact manner, comprising:
first and second electric power transmission units;
first and second control units for controlling the first and second electric power transmission units, respectively; and
a control device for overall control of the first and second control units,
the control device including a communication unit for communicating with the electric power reception device, and
the control device determining whether specified the electric power reception device is an electric power reception device to which electric power is to be transmitted from the first electric power transmission unit based on information from the electric power reception device specified as an electric power transmission target of the first electric power transmission unit through radio communication by the communication unit when electric power transmitted from the first electric power transmission unit is varied while the first electric power transmission unit transmits electric power.

11. An electric power reception device for receiving electric power from an electric power transmission device in a non-contact manner, comprising:
a communication unit for radio communication with the electric power transmission device; and
a control device,
the control device providing a request for variation in transmitted electric power to an electric power transmission device specified as an electric power transmission device which transmits electric power to the electric power reception device through radio communication by the communication unit while electric power is received, and determining whether the specified electric power transmission device is the electric power transmission device which should transmit electric power to the electric power reception device based on variation in transmitted electric power from the specified electric power transmission device.

12. The electric power reception device according to claim 11, wherein the control device determines that the specified electric power transmission device is the electric power transmission device which should transmit electric power to the electric power reception device when variation in the transmitted electric power meets the request.

13. The electric power reception device according to claim 11, further comprising an electric power reception unit for receiving electric power in a non-contact manner from an electric power transmission unit of the electric power transmission device, wherein
 a difference in natural frequency between the electric power transmission unit and the electric power reception unit is not greater than ±10% of the natural frequency of the electric power transmission unit or the natural frequency of the electric power reception unit.

14. The electric power reception device according to claim 11, further comprising an electric power reception unit for receiving electric power in a non-contact manner from an electric power transmission unit of the electric power transmission device, wherein
 a coefficient of coupling between the electric power transmission unit and the electric power reception unit is not greater than 0.1.

15. The electric power reception device according to claim 11, further comprising an electric power reception unit for receiving electric power in a non-contact manner from an electric power transmission unit of the electric power transmission device, wherein
 the electric power reception unit receives electric power from the electric power transmission unit through at least one of magnetic field formed between the electric power reception unit and the electric power transmission unit and oscillating at a specific frequency, and electric field formed between the electric power reception unit and the electric power transmission unit and oscillating at a specific frequency.

16. A vehicle, comprising:
 the electric power reception device according to claim 11;
 a power storage device chargeable with electric power received by the electric power reception device; and
 a drive device for generating running driving force with electric power from the power storage device.

17. A non-contact electric power feed system for conveying electric power in a non-contact manner, comprising:
 an electric power transmission device; and
 a vehicle capable of receiving electric power from the electric power transmission device in a non-contact manner,
 the electric power transmission device and the vehicle being configured to be capable of radio communication with each other,
 the electric power transmission device including
  an electric power transmission unit capable of supplying electric power to the vehicle in a non-contact manner, and
  a control device for controlling the electric power transmission unit, and
 the control device determining whether specified the vehicle is a vehicle to which electric power is to be transmitted from the electric power transmission unit based on information from the vehicle specified as an electric power transmission target through radio communication, when transmitted electric power from the electric power transmission unit is varied while the electric power transmission unit is transmitting electric power.

* * * * *